United States Patent
Laporte et al.

(10) Patent No.: US 10,284,405 B2
(45) Date of Patent: May 7, 2019

(54) TRANSMITTER ARCHITECTURE FOR MASSIVE-MIMO

(71) Applicant: Telefonaktiebolaget LM Ericsson (publ), Stockholm (SE)

(72) Inventors: Pierre-Andre Laporte, Gatineau (CA); Bilel Fehri, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 134 days.

(21) Appl. No.: 15/123,015

(22) PCT Filed: Jun. 24, 2016

(86) PCT No.: PCT/IB2016/053800
§ 371 (c)(1),
(2) Date: Sep. 1, 2016

(87) PCT Pub. No.: WO2017/221054
PCT Pub. Date: Dec. 28, 2017

(65) Prior Publication Data
US 2018/0219711 A1  Aug. 2, 2018

(51) Int. Cl.
*H04L 27/26* (2006.01)
*H04B 7/0413* (2017.01)
*H04B 7/06* (2006.01)

(52) U.S. Cl.
CPC ....... *H04L 27/2614* (2013.01); *H04B 7/0413* (2013.01); *H04B 7/0617* (2013.01);
(Continued)

(58) Field of Classification Search
CPC . H04L 27/368; H04L 27/2626; H04B 7/0617; H04B 7/0634; H04B 7/066; H04B 7/0413
(Continued)

(56) References Cited

U.S. PATENT DOCUMENTS 7,570,696 B2 * 8/2009 Maltsev ............... H04B 7/0634
                                                      375/260
9,923,595 B2 * 3/2018 Molina ..................... H04B 1/62
(Continued)

FOREIGN PATENT DOCUMENTS

GB        2409135 A       6/2005

OTHER PUBLICATIONS

Marquardt, Donald, W., "An Algorithm for Least-Squares Estimation of Nonlinear Parameters," Journal of the Society for Industrial and Applied Mathematics, vol. 11, Issue 2, Jun. 1963, Society for Industrial and Applied Mathematics, pp. 431-441.
(Continued)

*Primary Examiner* — Emmanuel Bayard
(74) *Attorney, Agent, or Firm* — Withrow & Terranova, PLLC

(57) ABSTRACT

Embodiments of a transmitter having an architecture that reduces power consumption and complexity are disclosed. In some embodiments, a transmitter comprises a modulator comprising an actuator, modulation circuitry, and an adaptor. The actuator is operable to apply at least one adjustment to at least one modulator input signal to provide at least one adjusted modulator input signal. The modulation circuitry is operable to perform a modulation operation on the at least one adjusted modulator input signal to provide a modulated signal, and the adaptor is operable to adaptively configure the at least one adjustment applied to the at least one modulator input signal such that a Peak-to-Average Ratio (PAR) of the modulated signal is reduced.

23 Claims, 20 Drawing Sheets

(52) U.S. Cl.
CPC ...... *H04L 27/2626* (2013.01); *Y02D 70/1262* (2018.01); *Y02D 70/164* (2018.01); *Y02D 70/444* (2018.01)

(58) Field of Classification Search
USPC .................. 375/267, 295, 297, 299, 347–349
See application file for complete search history.

(56) References Cited

U.S. PATENT DOCUMENTS

| | | | | |
|---|---|---|---|---|
| 2004/0171358 | A1* | 9/2004 | Karjalainen | H03F 1/3247 455/126 |
| 2005/0220003 | A1* | 10/2005 | Palaskas | H04B 1/30 370/210 |
| 2006/0008028 | A1* | 1/2006 | Maltsev | H03F 1/3247 375/297 |
| 2006/0067426 | A1* | 3/2006 | Maltsev | H04L 25/49 375/297 |
| 2006/0240786 | A1* | 10/2006 | Liu | H03F 1/3247 455/114.3 |
| 2008/0112506 | A1* | 5/2008 | Strong | H04L 5/1469 375/300 |
| 2008/0181285 | A1* | 7/2008 | Hwang | H04B 7/0452 375/148 |
| 2008/0267312 | A1* | 10/2008 | Yokoyama | H04L 27/2614 375/267 |
| 2009/0129257 | A1* | 5/2009 | Maltsev | H03F 1/0205 370/208 |
| 2009/0257421 | A1* | 10/2009 | Nakashima | H04L 27/2608 370/345 |
| 2010/0060356 | A1* | 3/2010 | Suzuki | H03F 1/3247 330/149 |
| 2010/0080320 | A1* | 4/2010 | Yano | H04L 1/0016 375/295 |
| 2010/0278225 | A1* | 11/2010 | Chun | H04L 5/0007 375/224 |
| 2011/0050339 | A1* | 3/2011 | Ohkawara | H03F 1/3247 330/149 |
| 2011/0064162 | A1* | 3/2011 | McCallister | H04L 27/2623 375/296 |
| 2013/0141160 | A1* | 6/2013 | Ohkawara | H03F 1/3247 330/149 |
| 2016/0308577 | A1* | 10/2016 | Molina | H04B 1/62 |
| 2017/0005627 | A1* | 1/2017 | Zhao | H03F 1/3252 |

OTHER PUBLICATIONS

Mohammed, Saif Khan, et al., "Per-antenna Constant Envelope Precoding for Large Multi-User MIMO Systems," IEEE Transactions on Communications, vol. 61, Issue 3, Jun. 13, 2012, IEEE, pp. 1-27.

Mohammed, Saif Khan, et al., "Single-User Beamforming in Large-Scale MISO Systems with Per-Antenna Constant-Envelope Constraints: The Doughnut Channel," IEEE Transactions on Wireless Communications, vol. 11, Issue 11, Nov. 16, 2011, IEEE, pp. 1-25.

Moré, Jorge J., "The Levenberg-Marquardt Algorithm: Implementation and Theory," Conference on Numerical Analysis, Lecture Notes in Mathematics 630, Jun. 28-Jul. 1, 1977, University of Dundee, Scotland, Springer Verlag, 16 pages.

Müller, Stefan H., et al., "A Comparison of Peak Power Reduction Schemes for OFDM," Proceedings of IEEE GLOBECOM, Nov. 1997, Phoenix, Arizona, IEEE, pp. 1-5.

Müller, Stefan H., et al., "OFDM with reduced peak-to-average power ratio by optimum combination of partial transmit sequences," Electronic Letters, vol. 33, Issue 5, Feb. 27, 1997, IEEE, pp. 368-369.

Ngo, Hien Quoc, et al., "Energy and Spectral Efficiency of Very Large Multiuser MIMO Systems," IEEE Transactions on Communications, vol. 61, Issue 4, May 21, 2012, IEEE, pp. 1-31.

International Search Report and Written Opinion for International Patent Application No. PCT/IB2016/053800, dated Mar. 28, 2017, 19 pages.

International Preliminary Report on Patentability for International Patent Application No. PCT/IB2016/053800, dated Sep. 13, 2018, 6 pages.

* cited by examiner

US 10,284,405 B2

TRANSMITTER ARCHITECTURE FOR MASSIVE-MIMO

This application is a 35 U.S.C. § 371 national phase filing of International Application No. PCT/IB2016/053800, filed Jun. 24, 2016, the disclosure of which is incorporated herein by reference in its entirety.

TECHNICAL FIELD

The present disclosure relates to a transmitter architecture for a wireless system and, in particular, a transmitter architecture that is particularly well-suited for, but not limited to, massive Multiple-Input-Multiple-Output (MIMO).

BACKGROUND

Future Fifth Generation (5G) wireless systems will need large antenna gains—which is achieved by having multiple antennas—in order to compensate for the very strong path loss of the millimeter-wave (mmWave) frequencies. There are even some discussions about massive Multiple-Input-Multiple-Output (MIMO) (i.e., Massive-MIMO) transmitters which would have hundreds of transmit antennas, and therefore, hundreds of radios.

In order to have energy efficient architectures, the Peak-to-Average Ratios (PARs) that each power amplifier will have to support has to be significantly lower than what they are today (typically around 7 decibels (dBs) at baseband). This is for two reasons, namely, (1) power amplifiers are much more efficient at low PARs and (2) it will not be possible to perform Crest Factor Reduction (CFR) as well as power amplifier predistortion on hundreds of power amplifiers and be energy efficient at the same time. Thus, there is a need to eliminate or reduce the need for both CFR and predistortion in the radio.

More specifically, FIG. 1 illustrates a conventional cellular transmitter 10 for an Orthogonal Frequency Division Multiplexing (OFDM) based system (e.g., a Long Term Evolution (LTE) network). As illustrated, the transmitter 10 includes an OFDM modulator 12, which includes a Serial-to-Parallel (S/P) converter 14 that converts a serial input data signal into multiple parallel input data signals. Each of the parallel input data signals corresponds to a different OFDM subcarrier. The parallel input signals are input to an Inverse Fast Fourier Transform (IFFT) function 16. The IFFT function 16 produces a modulated signal. A Cyclic Prefix (CP) function 18 inserts a cyclic prefix, as will be appreciated by one of ordinary skill in the art. The modulated signal output by the OFDM modulator 12 is provided to a radio front-end of the transmitter 10. Note that the "cloud" illustrated in the figure is to show that there may be additional components (e.g., filter(s), cables (e.g., an optical cable for a Common Public Radio Interface (CPRI) link), and/or the like) between the OFDM modulator 12 and the radio front-end of the transmitter 10. The radio front-end includes a CFR function 20 that perform CFR according to some CFR scheme. The output of the CFR function 20 is then predistorted by a Digital Predistortion (DPD) function 22. The predistorted signal is upconverted by an unconverter 24. At some point, either prior to, during, or after upconversion, the signal is converted from digital to analog. The upconverted, analog signal is amplified by a Power Amplifier (PA) 26 and transmitted via an antenna 28. The radio front-end also includes a Transmitter Observation Receiver (TOR) that includes a downconverter 30 having an input that is coupled to the output of the PA 26 via a coupler 32. The transmit signal is downconverted by the downconverter 30 to provide an observed transmit signal. An adaptor 34 then adapts the predistortion applied by the DPD function 22 according to some adaptation scheme (e.g., to compensate for a non-linear characteristic of the PA 26).

If the architecture of the conventional transmitter 10 were scaled up to support Massive-MIMO, the transmitter 10 would then include many (e.g., up to hundreds) of the radio front-ends. Therefore, the efficiency of the PA 26 becomes extremely important. Further, having hundreds of CFRs 20, DPDs 22, and TORs results in a large amount of complexity and power consumption. Thus, two main challenges for 5G Massive-MIMO are PA efficiency and transmitter complexity.

For 5G Massive-MIMO transmitters, it would be desirable to have extremely low PARs for each of the PAs (e.g., in the order of 3-4 dBs maximum) in order to get very good power efficiency. In addition, it would be desirable to eliminate or at least reduce the complexity of the CFR, DPD, and TOR in the radio front-end.

SUMMARY

Embodiments of a transmitter having an architecture that reduces power consumption and complexity are disclosed. While the embodiments disclosed herein are particularly well-suited for massive Multiple-Input-Multiple-Output (MIMO), the embodiments disclosed herein are not limited thereto.

In general, a transmitter comprises a modulator comprising an actuator, modulation circuitry, and an adaptor. The actuator is operable to apply at least one adjustment to at least one modulator input signal to provide at least one adjusted modulator input signal. The modulation circuitry is operable to perform a modulation operation on the at least one adjusted modulator input signal to provide a modulated signal, and the adaptor is operable to adaptively configure the at least one adjustment applied to the at least one modulator input signal such that a Peak-to-Average Ratio (PAR) of the modulated signal is reduced. By reducing the PAR of the modulated signal, the power efficiency of a radio front-end of the transmitter can be increased by increasing the efficiency of the Power Amplifier (PA) circuitry and a complexity of the radio front-end of the transmitter can be reduced by potentially avoiding the need for Crest Factor Reduction (CFR) as well as PA predistortion and the associated feedback path for adaptation of the PA predistortion.

In some embodiments, the at least one modulator input signal comprises a plurality of parallel modulator input signals for a respective plurality of subcarriers, the at least one adjustment comprises a plurality of adjustments, and the at least one adjusted modulator input signal comprises a plurality of adjusted modulator input signals. Further, the actuator is operable to apply the plurality of adjustments to the plurality of parallel modulator input signals to provide the plurality of adjusted modulator input signals, and the modulation circuitry is operable to perform the modulation operation on the plurality of adjusted modulator input signals to provide the modulated signal. Still further, in some embodiments, the modulator is an Orthogonal Frequency Division Multiplexing (OFDM) modulator, and the modulation circuitry comprises transform circuitry adapted to perform an inverse Fourier transform on the plurality of adjusted modulator input signals to provide the modulated signal.

In some embodiments, the plurality of adjustments comprise a plurality of adjustments for the plurality of subcarriers, respectively, for each of one or more symbol periods. In some other embodiments, the plurality of adjustments comprise a plurality of adjustments for each the plurality of subcarriers within a single symbol period. In some other embodiments, the plurality of adjustments comprise two or more adjustments for two or more groups of the plurality of subcarriers, respectively, for each of one or more symbol periods. In some other embodiments, the plurality of adjustments comprise two or more adjustments for each of two or more groups of the plurality of subcarriers within a single symbol period. In some other embodiments, the plurality of adjustments comprise a plurality of adjustments for a plurality of blocks of subcarriers and symbol periods, where each block of the plurality of blocks comprises two or more of the plurality of subcarriers and two or more symbol periods.

In some embodiments, the at least one adjustment is at least one phase adjustment.

In some embodiments, the adaptor is operable to adaptively configure the at least one adjustment such that an error between a magnitude of the modulated signal and a Root Mean Square (RMS) value of the modulated signal is minimized. In some embodiments, the adaptor is operable to adaptively configure the at least one adjustment in order to minimize a cost function.

In some embodiments, the transmitter is further adapted to transmit an indication of the at least one adjustment to a receiver. Further, in some embodiments, the transmitter is further adapted to transmit the indication of the at least one adjustment to the receiver via a channel separate from a channel over which the transmitter transmits the modulated signal to the receiver.

In some embodiments, the transmitter does not transmit an indication of the at least one adjustment to a receiver.

In some embodiments, the adaptor is operable to adaptively configure the plurality of adjustments applied to the plurality of parallel modulator input signals to provide both: (a) reduction of the PAR of the modulated signal and (b) MIMO precoding and/or beamforming. In some embodiments, the transmitter further comprises a second actuator operable to apply a plurality of weights to the modulated signal to thereby provide a plurality of modulated signals to be transmitted via a plurality of antennas of the transmitter, and the adaptor is operable to adaptively configure, in a joint manner: the plurality of adjustments applied to the plurality of parallel modulator input signals and the plurality of beamforming weights in a joint manner to provide both: (a) reduction of the PAR of the modulated signal and (b) MIMO precoding and/or beamforming; and the plurality of weights applied to the modulated signal by the second actuator to provide beamforming and/or antenna calibration.

In some embodiments, the transmitter further comprises a digital predistortion subsystem operable to digitally predistort the plurality of modulated signals to compensate for a non-linear characteristic of respective power amplification circuits.

In some embodiments, the modulator further comprises a second actuator operable to apply at least one second adjustment to at least one second modulator input signal to provide at least one second adjusted modulator input signal, and second modulation circuitry operable to perform a modulation operation on the at least one second adjusted modulator input signal to provide a second modulated signal. The adaptor is operable to adaptively configure the at least one adjustment applied to the at least one modulator input signal such that the PAR of the modulated signal is reduced and adaptively configure the at least one second adjustment applied to the at least one second modulator input signal such that a PAR of the second modulated signal is reduced.

In some embodiments, the modulator further comprises a second actuator operable to apply at least one second adjustment to at least one second modulator input signal to provide at least one second adjusted modulator input signal, and second modulation circuitry operable to perform a modulation operation on the at least one second adjusted modulator input signal to provide a second modulated signal. The adaptor is operable to adaptively configure the at least one adjustment applied to the at least one modulator input signal and the at least one second adjustment applied to the at least one second modulator input signal such that a PAR of a multi-carrier signal is reduced, the multi-carrier signal being an aggregation of a plurality of modulated signals comprising the first modulated signal and the second modulated signal.

In some embodiments, the transmitter is a wireless transmitter.

In some embodiments, the transmitter is a wireless transmitter of a radio node for a cellular communications network.

Embodiments of a method of operation of a transmitter are also disclosed. In some embodiments, the method comprises applying at least one adjustment to at least one modulator input signal to provide at least one adjusted modulator input signal, performing a modulation operation on the at least one adjusted modulator input signal to provide a modulated signal, and adaptively configuring the at least one adjustment applied to the at least one input signal such that a PAR of the modulated signal is reduced.

In some embodiments, a transmitter is adapted to apply at least one adjustment to at least one modulator input signal to provide at least one adjusted modulator input signal, perform a modulation operation on the at least one adjusted modulator input signal to provide a modulated signal, and adaptively configuring the at least one adjustment applied to the at least one input signal such that a PAR of the modulated signal is reduced.

In some embodiments, a transmitter comprises an adjusting module operable to apply at least one adjustment to at least one modulator input signal to provide at least one adjusted modulator input signal, a modulation operation performing module operable to perform a modulation operation on the at least one adjusted modulator input signal to provide a modulated signal, and a configuring module operable to adaptively configure the at least one adjustment applied to the at least one input signal such that a PAR of the modulated signal is reduced.

Embodiments of a receiver are also disclosed. In some embodiments, a receiver comprises at least one receiver subsystem operable to receive, from a transmitter, a first signal and a second signal, the second signal comprising an indication of at least one adjustment applied to at least one modulator input signal at the transmitter to provide at least one adjusted modulator input signal having a reduced PAR when generating the first signal for transmission at the transmitter. The at least one receiver subsystem is further operable to apply at least one adjustment during reception of the first signal that compensates for the at least one adjustment applied to the at least one modulator input signal at the transmitter.

In some embodiments, a transmitter is provided, wherein the transmitter is adapted to transmit an indication of at least one adjustment to a receiver, the at least one adjustment being at least one adjustment applied to reduce, during modulation, a PAR of a modulated signal transmitted from the transmitter to the receiver. In some embodiments, the transmitter is further adapted to transmit the indication of the at least one adjustment to the receiver via a channel separate from a channel over which the transmitter transmits the modulated signal to the receiver.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of a transmitter having an architecture that reduces power consumption and complexity are disclosed. While the embodiments disclosed herein are particularly well-suited for massive Multiple-Input-Multiple-Output (MIMO), the embodiments disclosed herein are not limited thereto. In general, the transmitter utilizes an architecture in which one or more input signals are adjusted prior to performing one or more modulation operations such that the resulting modulated signal has a reduced Peak-to-Average Ratio (PAR). In this manner, Power Amplifier (PA) efficiency can be improved while potentially eliminating the need for Crest Factor Reduction (CFR) and/or predistortion. Embodiments of a receiver are also disclosed.

Conventional transmitters for Orthogonal Frequency Division Multiplexing (OFDM) based wireless systems utilize CFR and PA predistortion because the modulator creates a large PAR. Indeed, CFR and predistortion would not be needed if the modulator would produce a constant envelope signal.

The present disclosure relates to embodiments of a transmitter that include an actuator as well as an adaptor that operate to adjust a modulator input signal(s) (e.g., parallel input signals conventionally provided to an Inverse Fast Fourier Transform (IFFT) of the OFDM modulator) prior to performing one or more modulation operations (e.g., prior to performing the IFFT) in order to reduce the PAR of the modulated signal (i.e., the output signal of the modulator). One of the benefits of this approach is that CFR, PA predistortion, and the Transmitter Observation Receiver (TOR) feedback path needed for adaption of the PA predistortion can then be eliminated. Another benefit is that the PAs—and there will be many of them in Fifth Generation (5G) transmitters—will then be much more power efficient. The reason for the increase in the efficiency of the PA is that the amount of PAR reduction that can be achieved by adjusting the modulator input signal(s) is by far more effective than what can be accomplished with traditional non-linear CFR algorithms which are fundamentally limited by the noise that they introduce into the system, which in turn limits the amount of PAR reduction that they can achieve to around 2.5-3 decibels (dBs) for a 5.5% Error Vector Magnitude (EVM) target.

Figure 1:
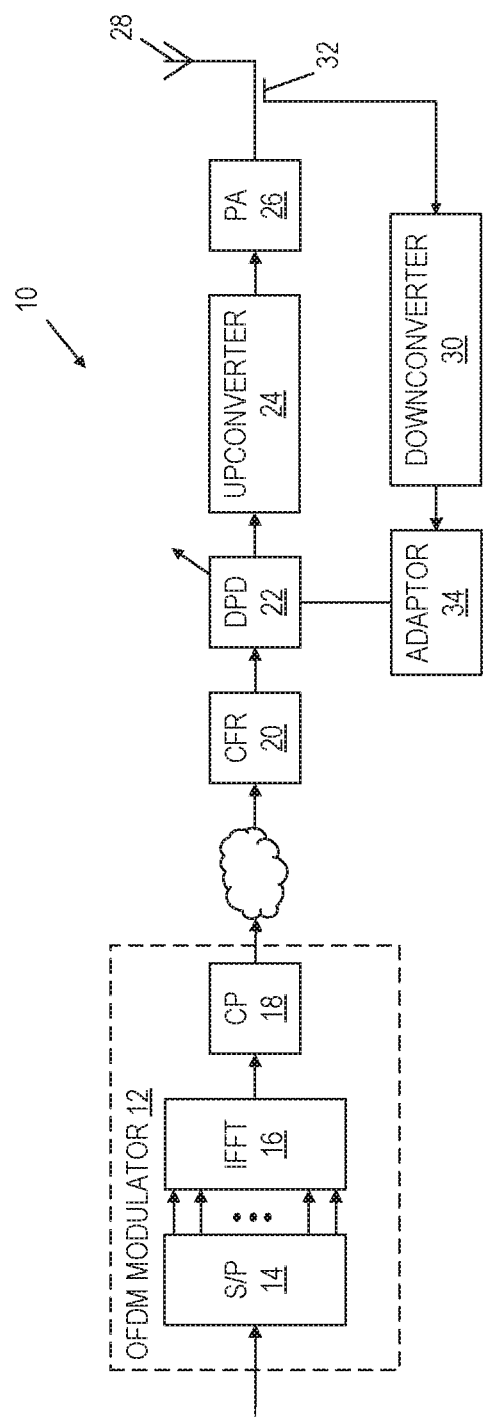
FIG. 1 illustrates one example of a conventional transmitter.
Figure 2:
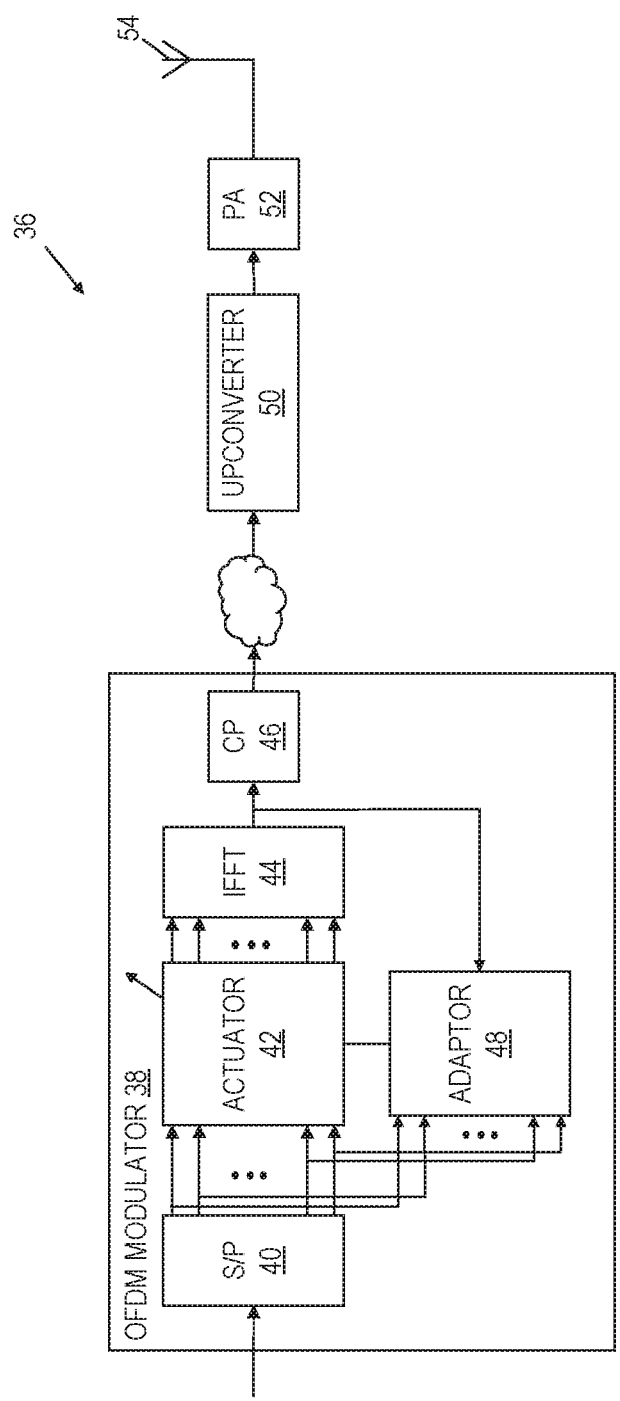
FIG. 2 illustrates one example of a transmitter that includes a modulator that applies one or more adjustments that reduce a Peak-to-Average Ratio (PAR) of a modulated signal output by the modulator according to some embodiments of the present disclosure.

In this regard, FIG. 2 illustrates a transmitter 36 according to some embodiments of the present disclosure. In this example, the transmitter 36 is for an OFDM based wireless system such as, for example, a transmitter of a radio access node (e.g., a base station) in a Long Term Evolution (LTE) cellular communications network for some LTE-based cellular communications network (e.g., LTE in unlicensed spectrum (LTE-U), License Assisted Access (LAA), Multe-Fire, etc.). Thus, as illustrated, the transmitter 36 includes an OFDM modulator 38. Note, however, in some alternative embodiments, the OFDM modulator 38 performs modulation according to some other multi-subcarrier modulation technique. The OFDM modulator 38 includes a Serial-to-Parallel (S/P) converter 40, an actuator 42, an IFFT function 44 (also referred to herein as an IFFT circuit), a Cyclic Prefix (CP) function 46 (also referred to herein as a CP circuit), and an adaptor 48. The S/P converter 40 receives a modulator input signal. The modulator input signal is a stream of data to be modulated. The S/P converter 40 converts the modulator input signal into multiple parallel modulator input signals, each corresponding to one of the OFDM subcarriers.

The actuator 42 applies at least one adjustment to each of the parallel modulator input signals to provide adjusted input signals. In some embodiments, the adjustment is a phase adjustment, and the actuator 42 is a phase adjuster. However, the present disclosure is not limited thereto. For example, the adjustment may be a phase adjustment; an amplitude and phase adjustment; an amplitude, phase, and time adjustment; or the like. As discussed below in detail, in some embodiments, the actuator 42 applies a separate adjustment to each of the parallel modular input signals (i.e., applies adjustments on a per-subcarrier basis). These adjustments may be updated by the adaptor 48 for each OFDM symbol, multiple times per OFDM symbol, or periodically (e.g., once every N OFDM symbols, where N>1). In some other embodiments, the actuator 42 applies a separate adjustment to each of two or more groups of the modulator input signals (e.g., applies adjustments on a per-subcarrier-group-basis). In other words, the same adjustment may be made to each of a group of the parallel modulator input signals, where a group of the parallel modulator input signals corresponds to a group of adjacent subcarriers. These adjustments may be updated by the adaptor 48 for each OFDM symbol, multiple times per OFDM symbol, or for each of multiple OFDM symbol period groups (e.g., group corresponds to M consecutive OFDM symbol periods, where M>1).

The IFFT function 44 performs an IFFT of the adjusted modulator input signals to provide a modulated signal. The CP function 46 adds a cyclic prefix to the modulated signal.

The adaptor 48 operates to adapt the adjustments applied to the parallel modulator input signals by the actuator 42 based on, in this example, the modulated signal output by the IFFT function 44 such that a PAR of the modulated signal is reduced. In some embodiments, the adaptor 48 operates to adaptively configure the adjustments applied by the actuator 42 such that a defined cost function is minimized. In some particular embodiments, the adaptor 48 operates to adaptively configure the adjustments applied by the actuator 42 such that an error between a magnitude of the modulated signal and a Root Mean Square (RMS) value of the modulated signal is reduced (e.g., minimized).

The modulated signal output by the OFDM modulator 38 is then processed by a radio front-end of the transmitter 36. Note that the "cloud" illustrated in the figure between the OFDM modulator 38 and the radio front-end of the transmitter 36 is to show that there may be additional components (e.g., filter(s), cables (e.g., an optical cable for a Common Public Radio Interface (CPRI) link), and/or the like) between the OFDM modulator 38 and the radio front-end of the transmitter 36. In this example, the radio front-end includes an upconverter 50 that upconverts and digital-to-analog converts the modulated signal to provide a Radio Frequency (RF) analog signal. The RF analog signal is amplified by a PA 52, and the resulting amplified RF signal is output to an antenna 54. Note that while the radio front-end in this example includes only one transmit chain (i.e., only one upconverter 50, one PA 52, and one antenna 54), the transmitter 36 is not limited thereto. The radio front-end of the transmitter 36 may include many transmit chains, as would be the case for Massive-MIMO. In this example, by adjusting the parallel modulated signals prior to performing the IFFT (i.e., prior to performing a modulation operation(s)) such that the PAR of the modulated signal is reduced, the need for CFR, predistortion, and a TOR in the radio front-end is eliminated. This in turn reduces power consumption and complexity of the transmitter 36. Note, however, that in some embodiments, the radio front-end of the transmitter 36 may include CFR and/or predistortion if desired. It should also be noted that the transmitter 36 may further include additional components that are not illustrated, as will be appreciated by one of ordinary skill in the art.

Figure 3:
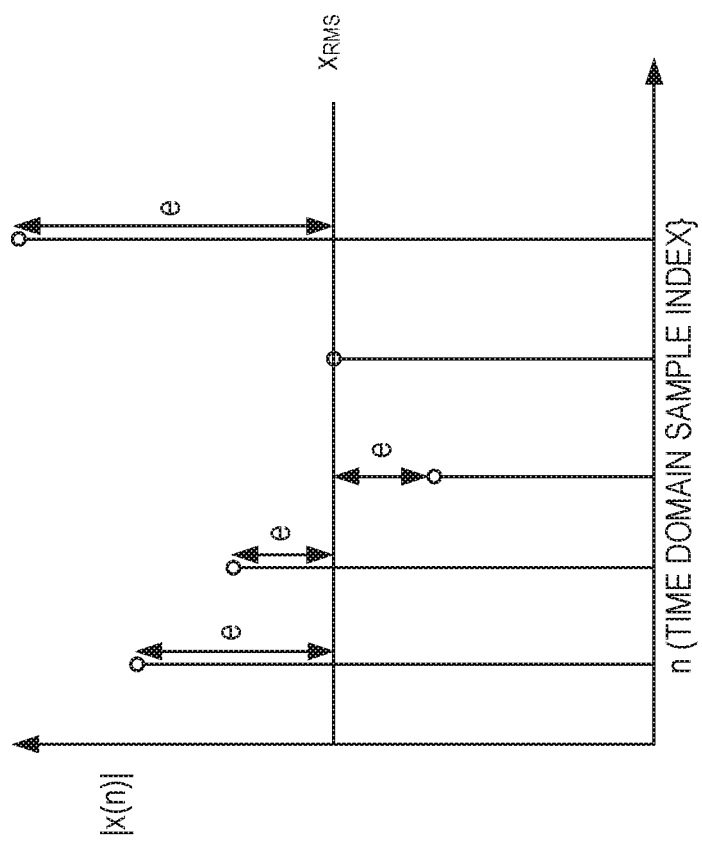
FIG. 3 illustrates an example of an error signal that is minimized by the adaptor of FIG. 2 according to some embodiments of the present disclosure.
Figure 4:
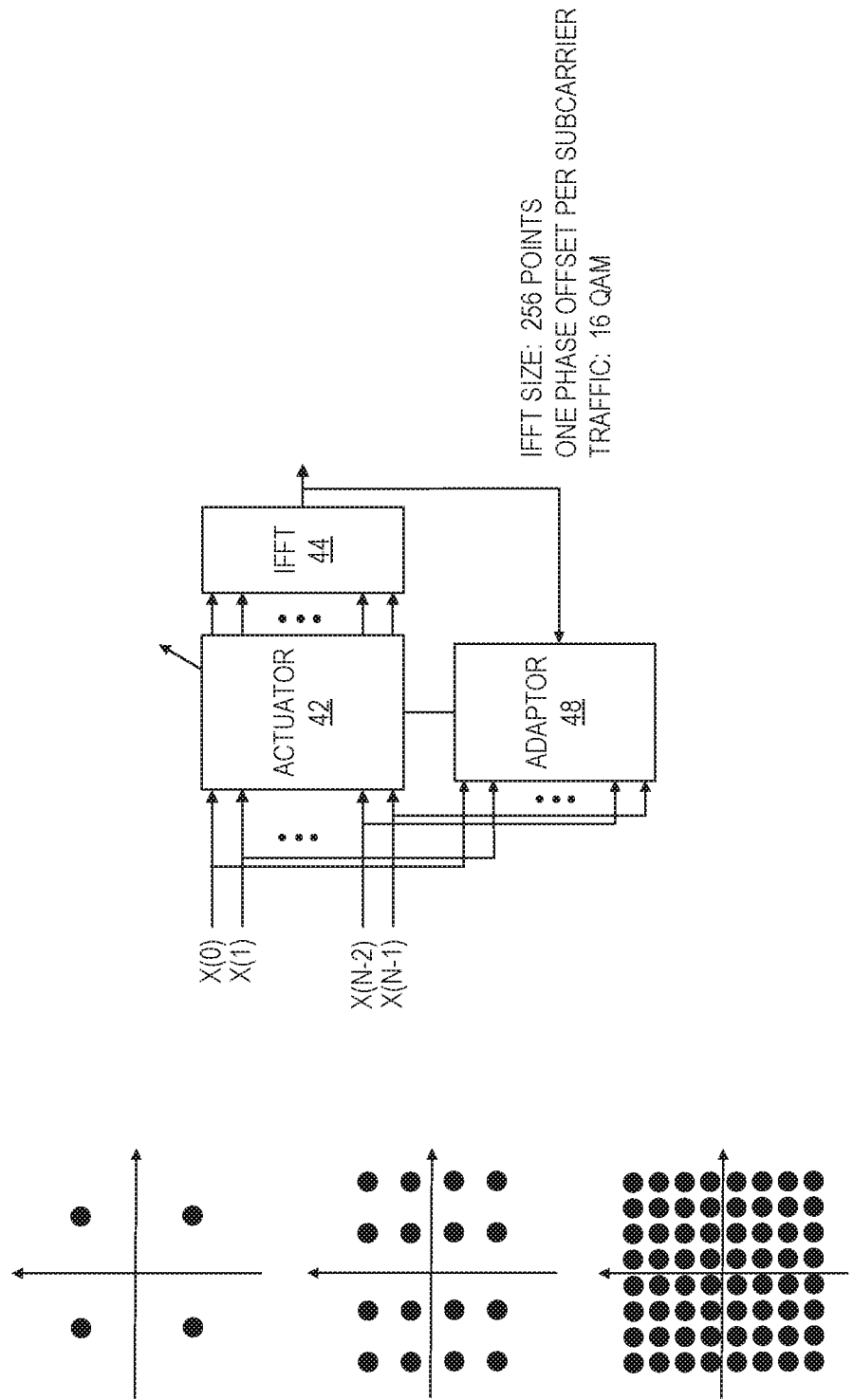
FIGS. 4 through 7 illustrate a test bench and simulation results that show the effectiveness of one example embodiment of the transmitter of FIG. 2.

In some embodiments, the actuator 42 applies phase shifts to the parallel modulator input signals (i.e., applies the phase shifts on a per-subcarrier basis). Determining the optimal phase shifts from a theoretical perspective is the key for defining a closed-loop equation. In order to do so, the ideal solution can be defined as follows: the time domain magnitude for all samples of the modulated signal needs to be equal to the modulated signal's RMS value. An error signal can then be defined in the time domain as shown in FIG. 3. The error signal (e) corresponds to the difference between the instantaneous magnitude of the modulated signal and the RMS value ($x_{RMS}$) of the modulated signal over at least one OFDM symbol. Ideally, the adaptor 48 operates to minimize the error signal (i.e., to reduce the error signal to zero) such that all samples of the modulated signal have a magnitude of $x_{RMS}$ and, as a result, the PAR of the modulated signal is zero. It should be highlighted that the samples which have a magnitude below the RMS value are also treated as errors.

The error signal is defined as:

$$e(n) = |x(n)| - x_{RMS} \tag{1}$$

where e(n) is the error signal, x(n) is the modulated signal, and $x_{RMS}$ is the RMS value of the modulated signal. Equation (1) can be solved as follows. The modulated signal, or more specifically the OFDM symbols output by the IFFT function 44, can be written as:

$$\begin{aligned} x(n) &= \sum_{k=0}^{N-1} X(k) \cdot e^{j2\pi \cdot f \cdot t} \\ &= \sum_{k=0}^{N-1} X(k) \cdot e^{j2\pi \cdot (k \cdot \Delta f) \cdot (nT_s)} \\ &= \sum_{k=0}^{N-1} X(k) \cdot e^{j2\pi \cdot \left(k \cdot \frac{fs}{N}\right)\left(\frac{n}{fs}\right)} \end{aligned} \tag{2}$$

$$= \sum_{k=0}^{N-1} X(k) \cdot e^{j2\pi \cdot k \cdot n/N}$$

where x (lower-case x) is the time domain waveform, t is the time in seconds, n is the time domain sample index, fs is the sampling rate in Hertz, Ts is the sampling period in seconds and it corresponds to 1/fs, and X (capital X) is the frequency domain waveform. In OFDM transmissions, X also corresponds to the symbols to be transmitted. k is the frequency domain index, N is the number of subcarriers and it also corresponds to the number of points in the IFFT, and $\Delta f$ is the frequency spacing in Hertz between two subcarriers and is equal to fs/N.

The actuator 42 applies some phase shift $\varphi(k)$ to the different subcarriers so that the PAR is minimized. In this example, the phase shifts are constant for at least one OFDM symbol. Therefore, the time domain waveform can be written as:

$$x(n) = \sum_{k=0}^{N-1} X(k) \cdot e^{j\varphi(k)} \cdot e^{j2\pi \cdot k \cdot n/N} \quad (3)$$

$$= \sum_{k=0}^{N-1} X(k) \cdot e^{j\varphi(k)} \cdot z_N^{k \cdot n} \quad (4)$$

where $$z_N = e^{j\frac{2\pi}{N}}.$$

Equation 4 can be re-written in a matrix form as follows:

$$x_{[1 \times N]} = X_{[1 \times N]} \cdot \text{diag}(\varphi)_{[N \times N]} \cdot Z_{[N \times N]} \quad (5)$$

Since it is desired for the error signal e(n) defined in Equation (1) to be zero, the following is true:

$$e(n) = |x(n)| - x_{RMS} = 0 \quad (6)$$
$$\Rightarrow |x(n)| = x_{RMS} \quad (7)$$
$$\Rightarrow |x(n)|^2 = x_{RMS}^2 \quad (8)$$
$$\Rightarrow |x(n)|^2 - x_{RMS}^2 = 0 \quad (9)$$

where:

$$x_{RMS}^2 = \frac{x_{[1 \times N]} \cdot x'_{[N \times 1]}}{N} \text{ and} \quad (10)$$

$$|x(n)|^2 = x(n) \cdot x(n)^* \quad (11)$$

Equation (11) can be written in a vector form as follows:

$$|x|_{[1 \times N]}^2 = x_{[1 \times N]} \cdot \text{diag}(x')_{[N \times N]} \quad (12)$$

Equation (9) is the equation that we need to solve in order to minimize the PAR.

The next step is to substitute Equation (5) into Equation (10) so that we can derive the complete expression of the RMS value:

$$\Rightarrow x_{RMS}^2 = \frac{(X_{[1 \times N]} \cdot \text{diag}(\varphi)_{[N \times N]} \cdot Z_{[N \times N]}) \cdot (Z'_{[N \times N]} \cdot \text{diag}(\varphi')_{[N \times N]} \cdot X'_{[N \times 1]})}{N} \quad (13)$$

On the right hand side of Equation (13), the product $Z_{[N \times N]} \cdot Z'_{[N \times N]}$ corresponds to the cross-correlation between the subcarriers of the OFDM system. It gives the following result where the cross-correlation is zero and the auto-correlation is N:

$$Z_{[N \times N]} \cdot Z'_{[N \times N]} = \begin{bmatrix} N & 0 & \cdots & 0 \\ 0 & N & 0 & 0 \\ \vdots & 0 & \ddots & \vdots \\ 0 & 0 & \cdots & N \end{bmatrix} = N \cdot I_{[N \times N]} \quad (14)$$

Substituting Equation (14) into Equation (13) provides:

$$x_{RMS}^2 = \frac{X_{[1 \times N]} \cdot \text{diag}(\varphi)_{[N \times N]} \cdot N \cdot I_{[N \times N]} \cdot \text{diag}(\varphi')_{[N \times N]} \cdot X'_{[N \times 1]}}{N} \quad (15)$$

$$= X_{[1 \times N]} \cdot \text{diag}(\varphi)_{[N \times N]} \cdot I_{[N \times N]} \cdot \text{diag}(\varphi')_{[N \times N]} \cdot X'_{[N \times 1]}$$

Again, the central term on the right hand side of Equation (15) can be simplified since $\varphi$ and $\varphi'$ are phasors of amplitude equal to one and of opposite phases:

$$\text{diag}(\varphi)_{[N \times N]} \cdot I_{[N \times N]} \cdot \text{diag}(\varphi')_{[N \times N]} = I_{[N \times N]} \quad (16)$$

Substituting Equation (16) into Equation (15) we obtain:

$$x_{RMS}^2 = X_{[1 \times N]} \cdot I_{[N \times N]} \cdot X'_{[N \times 1]} \quad (17)$$

$$= X_{[1 \times N]} \cdot X'_{[N \times 1]}$$

Now that the fundamental expression of the RMS value in the time domain Equation (17) is found, it can be substituted back into Equation (9)—which is the problem that needs to be solved. Equation (9) is recalled for convenience:

$$|x(n)|^2 - x_{RMS}^2 = 0 \quad (9)$$

$$(17) \rightarrow (9): \Rightarrow |x(n)|^2 - X_{[1 \times N]} \cdot X'_{[N \times 1]} = 0 \quad (18)$$

The next step is to find the fundamental expression for the instantaneous power of the time domain envelope. Substituting Equation (5) into Equation (12), recalled here for convenience:

$$x_{[1 \times N]} = X_{[1 \times N]} \cdot \text{diag}(\varphi)_{[N \times N]} \cdot Z_{[N \times N]} \quad (5)$$

$$|x|_{[1 \times N]}^2 = x_{[1 \times N]} \cdot \text{diag}(x')_{[N \times N]} \quad (12)$$

$$(5) \rightarrow (12): \Rightarrow |x|_{[1 \times N]}^2 = (X_{[1 \times N]} \cdot \text{diag}(\varphi)_{[N \times N]} \cdot Z_{[N \times N]}) \cdot \text{diag}(\varphi')_{[N \times N]} \cdot X'_{[N \times 1]}) \quad (19)$$

Substituting Equation (19) into Equation (18), the final equation that needs to be solved is obtained:

$$(X_{[1 \times N]} \cdot \text{diag}(\varphi)_{[N \times N]} \cdot Z_{[N \times N]}) \cdot \text{diag}(Z'_{[N \times N]} \cdot \text{diag}(\varphi')_{[N \times N]} \cdot X'_{[N \times 1]}) - X_{[1 \times N]} \cdot X'_{[N \times 1]} = 0 \quad (20)$$

Equation (20) can be solved in multiple ways. One of the possible approaches is to use non-linear least-squares algorithms such as the trust-region-dogleg algorithm described in Marquardt, D., "An Algorithm for Least-Squares Estimation of Nonlinear Parameters," Journal of the Society for Industrial and Applied Mathematics, Vol. 11, No. 2, pages 431-441, June 1963 or the Levenberg-Marquardt Algorithm described in Moré, J. J., "The Levenberg-Marquardt Algorithm: Implementation and Theory," Numerical Analysis, ed. G. A. Watson, Lecture Notes in Mathematics, Vol. 630, Springer Verlag, pages 105-116, Jun. 28-Jul. 1, 1977. Thus, in some embodiments, the adaptor 48 operates to solve Equation (20) using a suitable technique such as, for example, a non-linear least-squares algorithm or the Levenberg-Marquardt Algorithm.

Note that there may be situations where it is desirable to have a constant phase shift over multiple contiguous subcarriers for one or multiple OFDM symbols. One example of such situation would be in the case where it is desirable to minimize the amount of side information that is transmitted to the receiver for decoding (discussed below). These constraints can be embedded into the optimization algorithm as well. In addition, the optimization algorithm may be performed on a group of OFDM symbols so that the phase offsets are constant for a longer time interval, further reducing the amount of side information to be transmitted, for example.

As a non-limiting example, FIGS. 4 through 7 illustrate a test bench and simulation results that show the effectiveness of one example embodiment of the transmitter 36 of FIG. 2. In this example, the IFFT size was set to 256 points, 16 Quadrature Amplitude Modulation (QAM) traffic was applied to every subcarrier, and the actuator had the freedom to assign a different phase offset for every subcarrier with the goal of generating one constant envelope OFDM symbol.

In this particular example, the adaptor was minimizing Equation (20) above, which is recalled here, using a non-linear least-squares algorithm:

$$(X_{[1 \times N]} \cdot \text{diag}(\varphi)_{[N \times N]} \cdot Z_{[N \times N]}) \cdot \text{diag}(Z'_{[N \times N]} \cdot \text{diag}(\varphi')_{[N \times N]} \cdot X'_{[N \times 1]}) - X_{[1 \times N]} \cdot X'_{[N \times 1]} = 0$$

where X is the frequency domain data (i.e., the Quadrature Phase Shift Keying (QPSK)/QAM traffic), φ are the actuator phase shifts, Z is the matrix of the inverse Z-transform used to model the IFFT, and N is the number of IFFT points.

Figure 5:
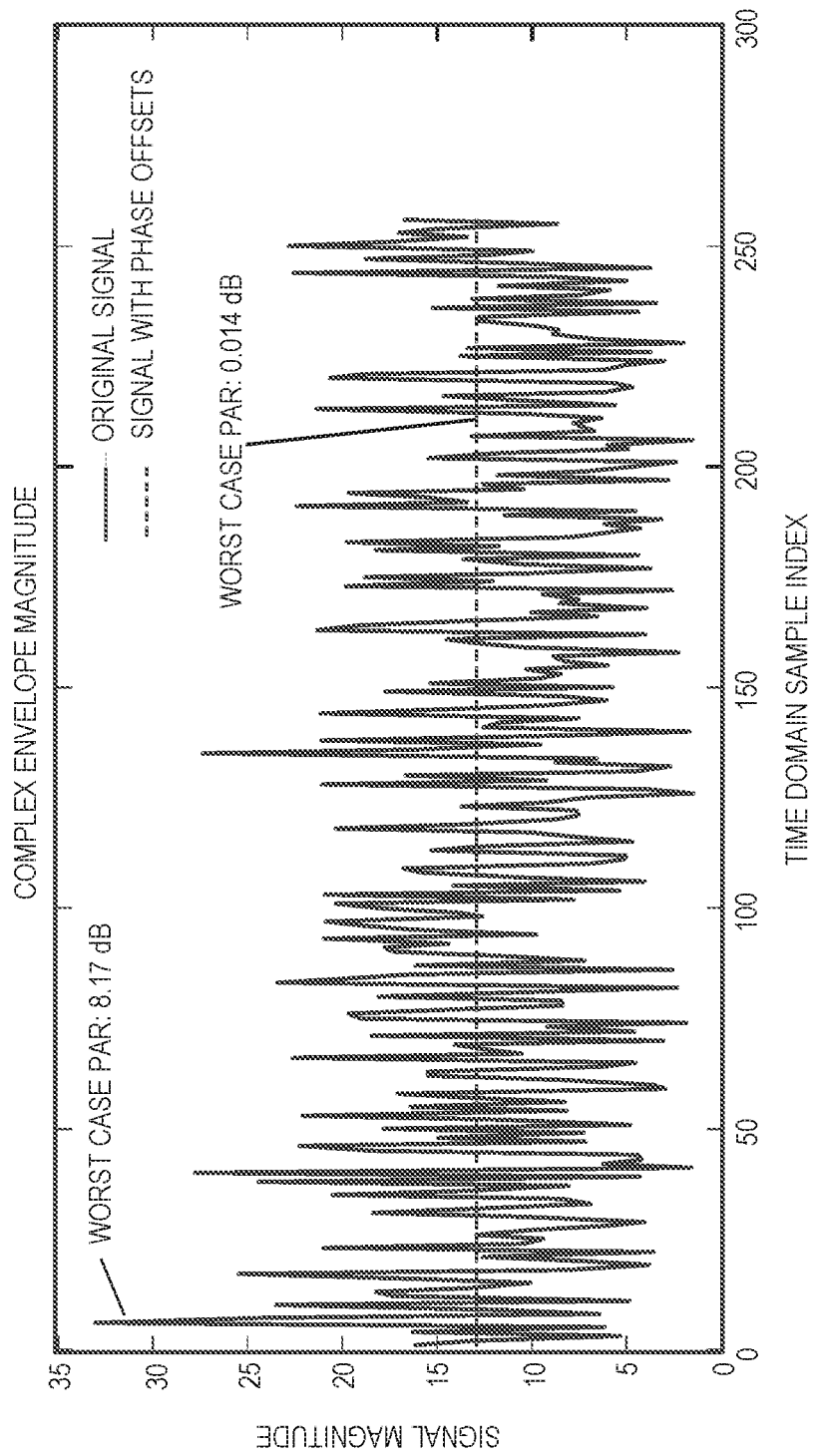

The result from the adaptation for one OFDM symbol is shown in FIG. 5. As can be seen in FIG. 5, the worst case PAR for one OFDM symbol went from 8.17 dB to 0.014 dB which essentially corresponds to a constant envelope signal. With such a low PAR, no CFR, Digital Predistortion (DPD), and TOR are required in the radio resulting in a tremendous complexity reduction. In addition, the efficiency of the PAs will increase significantly and it may allow for the use of less complex PA architectures.

Figure 6:
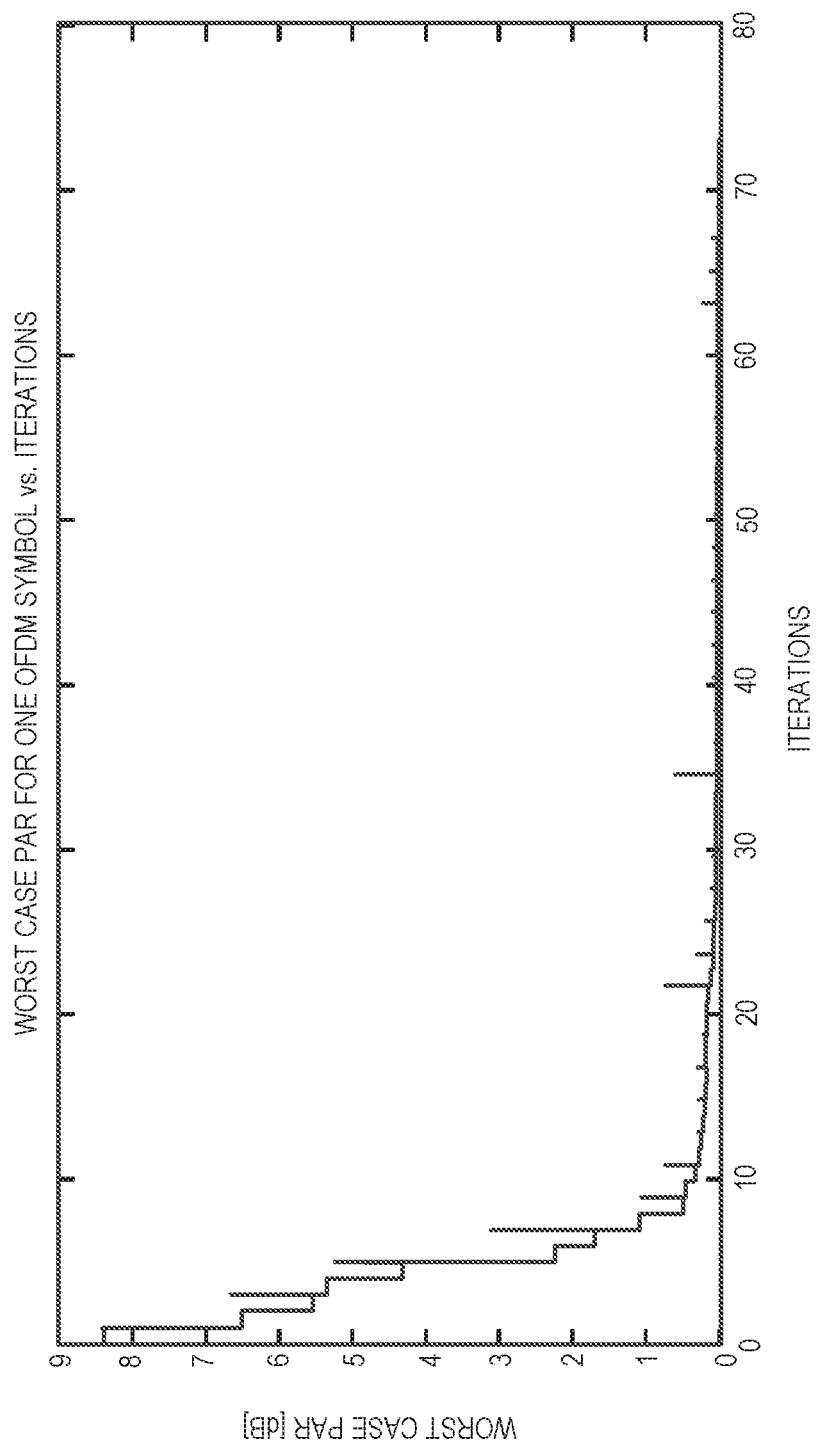

The example of FIG. 5 corresponds to the ideal scenario where there is a constant envelope signal. In the simulation, the adaptor had to work through 73 iterations to get to that level. Note that there are diminishing returns in terms of PAR reduction from iteration to iteration as shown in FIG. 6. From FIG. 6, it can be seen that 10 to 20 iterations are sufficient to get below 1 dB of worst case PAR with some safety of margin, which may be sufficient in some implementations.

Figure 7:
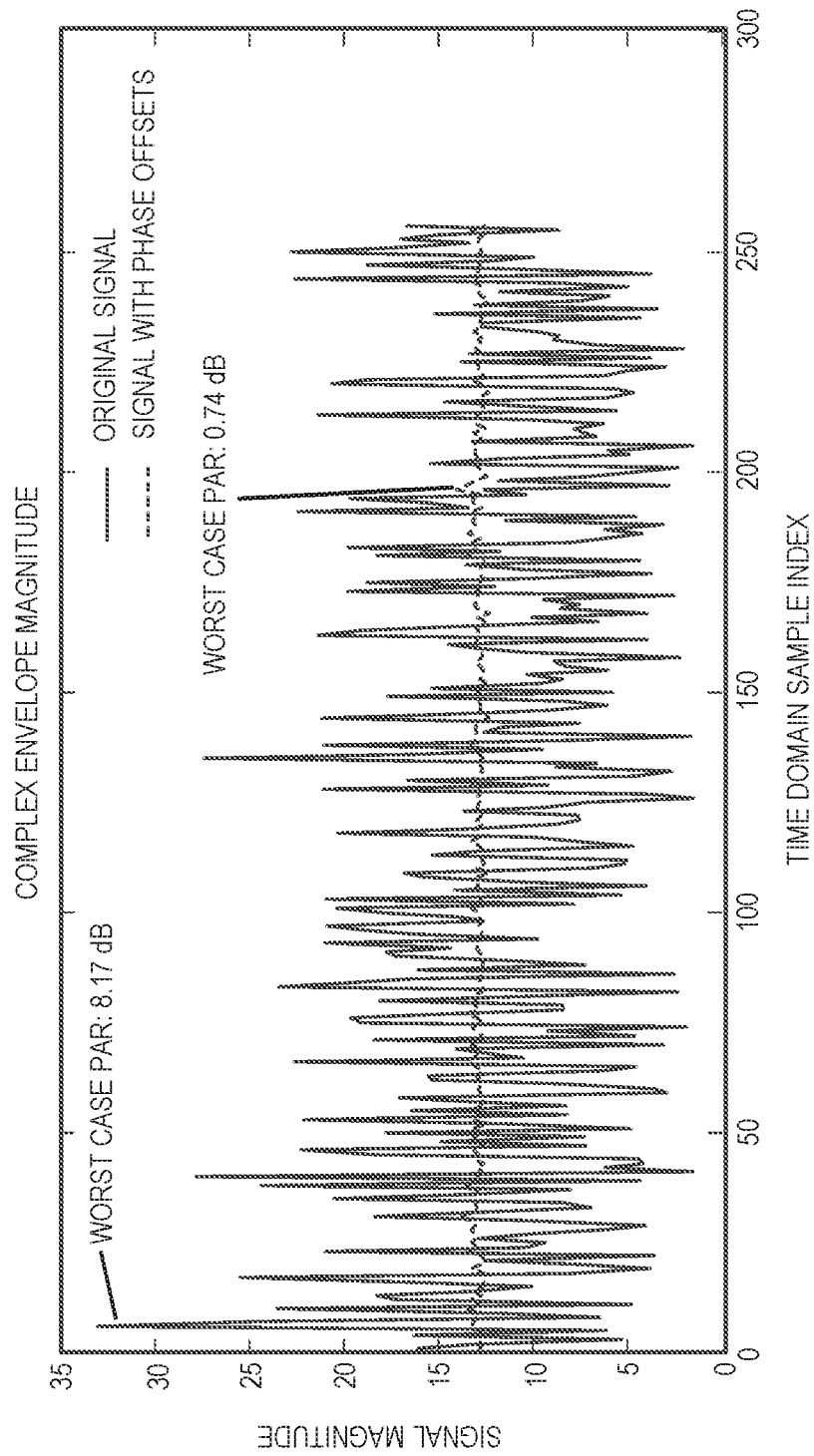

There are many situations where is may be desirable to relax the adaptation exit criterion so that the symbol is processed more rapidly (and power consumption required for the adaptation is reduced) and very low PAR is still achieved. FIG. 7 shows the result from the adaptation for the same OFDM symbol when the adaptation exit criterion is relaxed. In this particular example, the worst case PAR was reduced from 8.17 dB to 0.74 dB in only 10 iterations.

Figure 8:
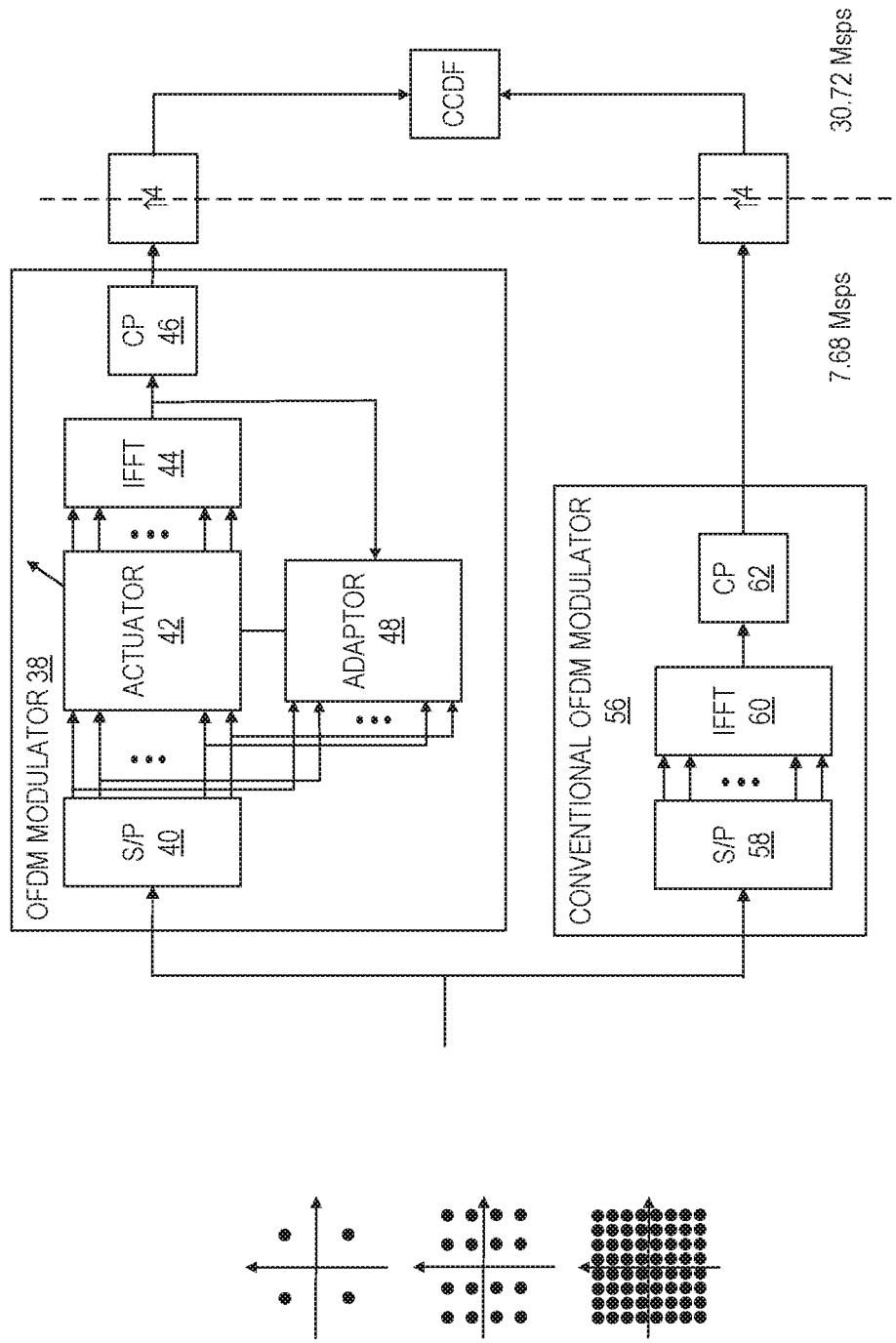
FIGS. 8 and 9 illustrate a second test bench and respective simulation results that extend the simulation of FIGS. 4 through 7 from one Orthogonal Frequency Division Multiplexing (OFDM) symbol to an entire Long Term Evolution (LTE) frame.
Figure 9:
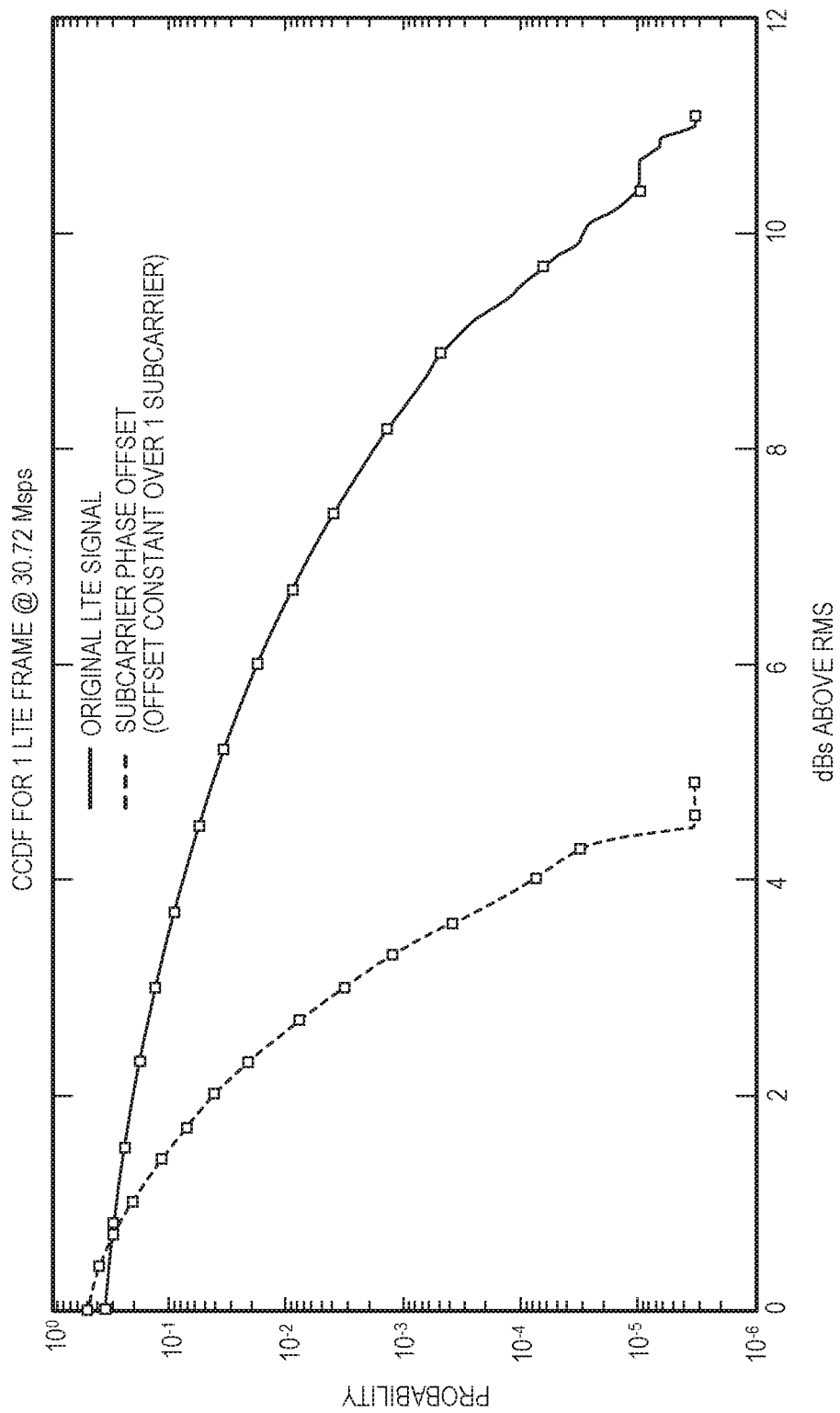

FIGS. 8 and 9 illustrate a second test bench and respective simulation results that extend the simulation from one OFDM symbol to an entire LTE frame. In this example, a 5 megahertz (MHz) OFDM carrier was generated by means of a 512 point IFFT. Out of the 512 subcarriers, 301 of them were carrying QPSK traffic and the other ones were zeroed out. A short cyclic prefix was then inserted for each OFDM symbol.

The (PAR-reduced) modulated signal output by the OFDM modulator 38 was compared to a respective modulated signal output of a conventional OFDM modulator 56, which includes an S/P converter 58, an IFFT function 60, and a CP function 62. The (PAR-reduced) modulated signal output by the OFDM modulator 38 and the modulated signal output by the conventional OFDM modulator 38 were interpolated by 4 and their Complementary Cumulative Distribution Function (CCDF) curves were compared. That the signals were interpolated by 4 is helpful because not all the peaks are visible at the lower sampling rate. It is a common practice to upconvert the signals before plotting their CCDF curves.

In order to speed up the simulation time, the adaptation exit criterion was relaxed so that only 33 iterations were used on average for every OFDM symbol. The CCDF curves for the original and modified LTE frames are plotted in FIG. 9. The results are very promising; the CCDF is improved by ~5.6 dBs at a probability of $10^{-4}$ and this has been achieved using a relaxed adaptation.

The PAR for this second test case is larger than in the first test case. This difference is explained by the fact that traffic was applied to all subcarriers in the first test case to prove the general idea. The performance of the algorithm decreased once zeros were introduced in this second test case for the guard band.

Figure 10:
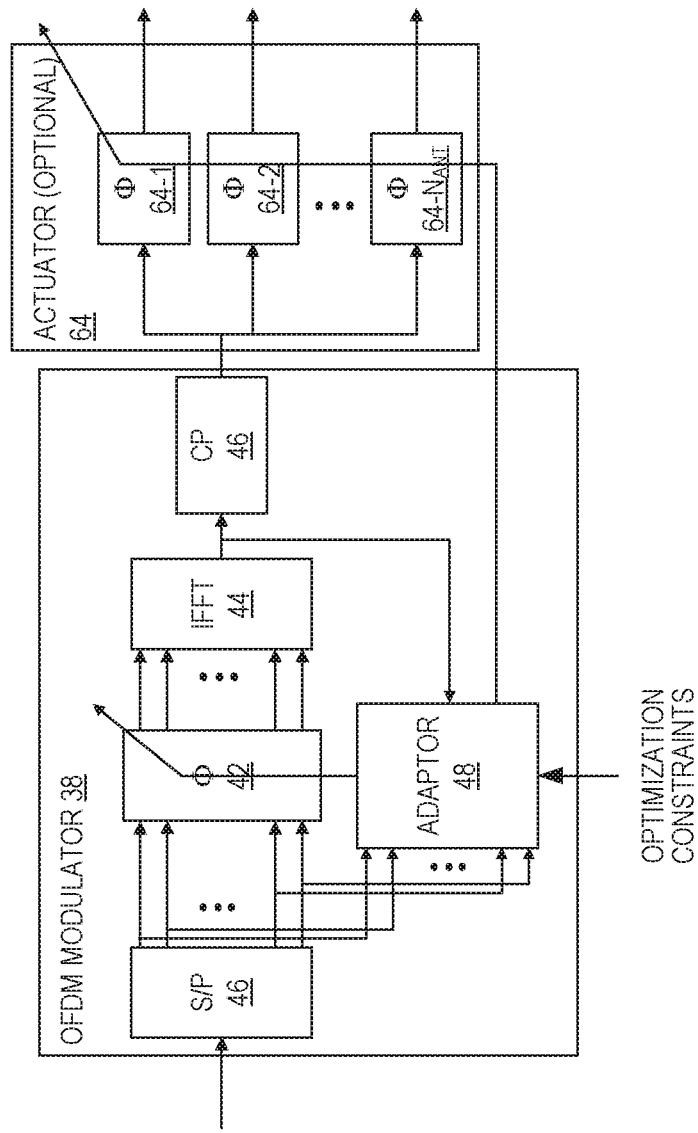
FIG. 10 illustrates a modulator according to some other embodiments in which the adaptor operates to adaptively configure the adjustments (e.g., complex weights) applied by the actuator to both reduce (e.g., minimize) the PAR of the modulated signal output by the modulator and perform beamforming and/or Multiple-Input-Multiple-Output (MIMO) precoding.

FIG. 10 illustrates the OFDM modulator 38 according to some other embodiments in which the adaptor 48 operates to adaptively configure the adjustments (e.g., complex weights) applied by the actuator 42 to both: (a) reduce (e.g., minimize) the PAR of the modulated signal output by the OFDM modulator 38 and (b) perform beamforming and/or MIMO precoding. More specifically, the adaptor 38 jointly optimizes the adjustments (e.g., complex weights) applied by the actuator 42 to reduce (e.g., minimize) the PAR of the modulated signal and to perform beamforming and/or MIMO precoding. In some embodiments, one or more optimization constraints are received and applied by the adaptor 48. These constraints may be obtained, e.g., from registers in the transmitter 36 which the configurations are stored. While not being limited thereto, some examples of the optimization constraint(s) include the following: a constraint to minimize $e_1(n), e_2(n), \ldots, e_N(n)$ (the error signal for each of the N transmit antennas) subject to $X_{\omega[N \times 1]}^{Pre\text{-}Coded} = H_{\omega[N \times M]}^{\dagger} \cdot X_{[M \times 1]}$ (in the case of linear zero-forcing precoding) where H is the Multi-User MIMO (MU-MIMO) channel response, M is the number of receive antennas (could also be the number of users assuming simple User Equipment devices (UEs) with only one receive antenna), w is the number of used subcarriers in the OFDM signal (i.e., excluding the guard band subcarriers), N is the number of TX antennas at the base station, and $H^{\dagger}$ is the pseudo-inverse of H.

In addition, the transmitter 36 may optionally include a second actuator 64 that includes a number of phase shifters, or phase actuators, 64-1 through 64-$N_{ANT}$, where $N_{ANT}$ is the number of antennas of the transmitter 36. The actuator 64 may be used to apply additional weights for beamforming and/or antenna calibration, where the adaptor 48 jointly optimizes the adjustments applied by the actuator 42 and the adjustments applied by the actuator 64 to provide PAR reduction, optionally MIMO precoding, and beamforming and/or antenna calibration. Thus, the adaptor 42 may adaptively configure, jointly, the actuators 42 and 64 to provide PAR reduction (via the actuator 42), MIMO precoding (via the actuator 42), and beamforming (via the actuator 42 and/or the actuator 64) and/or antenna calibration (via the actuator 64). Any suitable joint optimization technique may be used.

Figure 11:
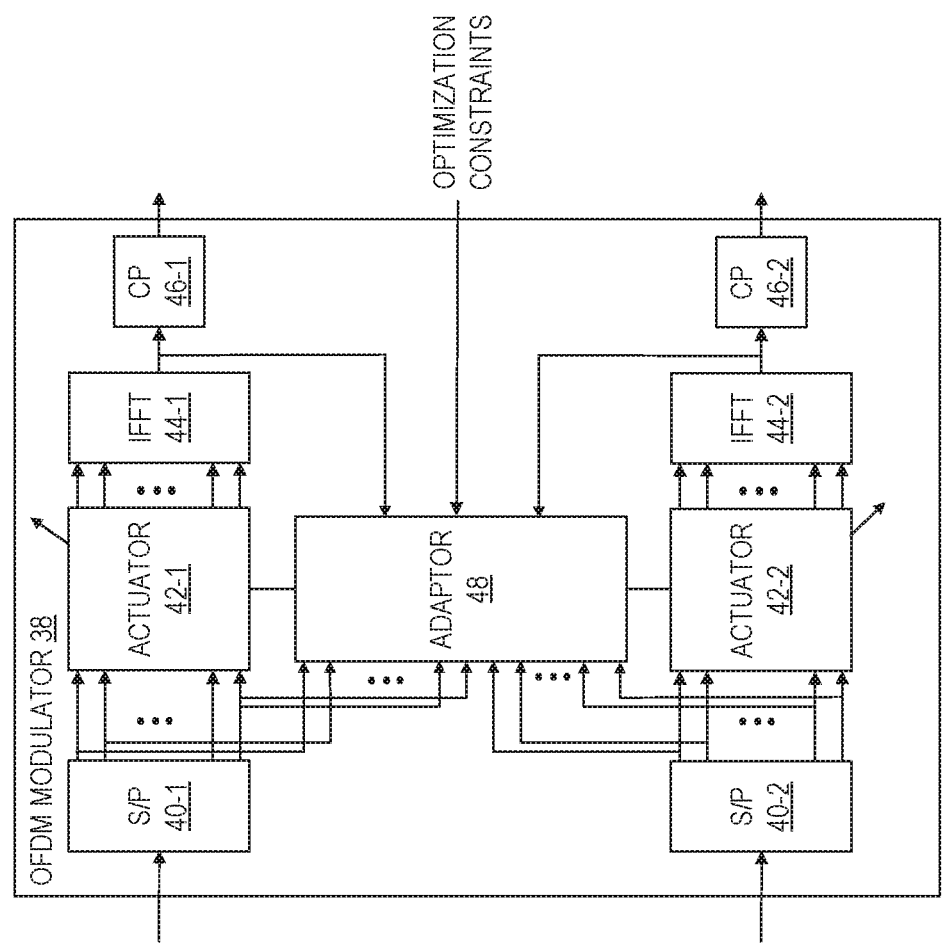
FIG. 11 illustrates a modulator according to another embodiment of the present disclosure in which the modulator is a multi-carrier modulator for a multi-carrier transmitter.

The embodiments thus far have focused on a single-band or single (OFDM) carrier scenario. However, the transmitter architecture discussed herein is easily extendible to multi-carrier and/or multi-band architectures. Here, multiple (OFDM) carriers may be within a single frequency band or span multiple frequency bands. In this regard, FIG. 11 illustrates the OFDM modulator 38 according to another embodiment of the present disclosure in which the OFDM modulator 38 is a multi-carrier OFDM modulator 38 for a multi-carrier embodiment of the transmitter 36 (e.g., where the transmitter 36 includes a single radio front-end for both carriers). The multiple carriers may be in the same frequency band or multiple frequency bands. In the particular example of FIG. 11, the OFDM modulator 38 is a dual-carrier OFDM modulator 38. Each carrier is an OFDM carrier (e.g., an LTE carrier), but is not limited thereto.

As illustrated in FIG. 11, for the first carrier, the OFDM modulator 38 includes a first S/P converter 40-1, a first actuator 42-1, a first IFFT function 44-1 (also referred to herein as an IFFT circuit), and a first CP function 46-1 (also referred to herein as a CP circuit). For the second carrier, the OFDM modulator 38 includes a second S/P converter 40-2, a second actuator 42-2, a second IFFT function 44-2 (also referred to herein as an IFFT circuit), and a second CP function 46-2 (also referred to herein as a CP circuit). The OFDM modulator 38 also includes the adaptor 48.

The S/P converter 40-1 receives a modulator input signal for the first carrier and converts the modulator input for the first carrier into multiple parallel modulator input signals, each for a respective OFDM subcarrier. The actuator 42-1 applies at least one adjustment to each of the parallel modulator input signals to provided adjusted input signals for the first carrier. In some embodiments, the adjustment is a phase adjustment, and the actuator 42-1 is a phase adjuster. However, the present disclosure is not limited thereto. For example, the adjustment may be a phase adjustment; an amplitude and phase adjustment; an amplitude, phase, and time adjustment; or the like. In some embodiments, the actuator 42-1 applies a separate adjustment to each of the parallel modular input signals (i.e., applies adjustments on a per-subcarrier basis). These adjustments may be updated by the adaptor 48 for each OFDM symbol, multiple times per OFDM symbol, or periodically (e.g., once every N OFDM symbols, where N>1). In some other embodiments, the actuator 42-1 applies a separate adjustment to each of two or more groups of the modulator input signals (e.g., applies adjustments on a per-subcarrier-group-basis). In other words, the same adjustment may be made to each of a group of the parallel modulator input signals, where a group of the parallel modulator input signals corresponds to a group of adjacent subcarriers. These adjustments may be updated by the adaptor 48 for each OFDM symbol, multiple times per OFDM symbol, or for each of multiple OFDM symbol period groups (e.g., group corresponds to M consecutive OFDM symbol periods, where M>1).

The IFFT function 44-1 performs an IFFT of the adjusted modulator input signals to provide a modulated signal for the first carrier. The CP function 46-1 adds a cyclic prefix to the modulated signal for the first carrier.

In the same manner, the S/P converter 40-2 receives a modulator input signal for the second carrier and converts the modulator input for the second carrier into multiple parallel modulator input signals, each for a respective OFDM subcarrier. The actuator 42-2 applies at least one adjustment to each of the parallel modulator input signals to provided adjusted input signals for the second carrier. In some embodiments, the adjustment is a phase adjustment, and the actuator 42-2 is a phase adjuster. However, the present disclosure is not limited thereto. For example, the adjustment may be a phase adjustment; an amplitude and phase adjustment; an amplitude, phase, and time adjustment; or the like. In some embodiments, the actuator 42-2 applies a separate adjustment to each of the parallel modular input signals (i.e., applies adjustments on a per-subcarrier basis). These adjustments may be updated by the adaptor 48 for each OFDM symbol, multiple times per OFDM symbol, or periodically (e.g., once every N OFDM symbols, where N>1). In some other embodiments, the actuator 42-2 applies a separate adjustment to each of two or more groups of the modulator input signals (e.g., applies adjustments on a per-subcarrier-group-basis). In other words, the same adjustment may be made to each of a group of the parallel modulator input signals, where a group of the parallel modulator input signals corresponds to a group of adjacent subcarriers. These adjustments may be updated by the adaptor 48 for each OFDM symbol, multiple times per OFDM symbol, or for each of multiple OFDM symbol period groups (e.g., group corresponds to M consecutive OFDM symbol periods, where M>1).

The IFFT function 44-2 performs an IFFT of the adjusted modulator input signals to provide a modulated signal for the second carrier. The CP function 46-2 adds a cyclic prefix to the modulated signal for the second carrier.

The adaptor 48 operates to adaptively configure the adjustments applied by the actuators 42-1 and 42-2 based on the modulated signals output by the IFFT functions 44-1 and 44-2. In some embodiments, the adaptor 48 adaptively configures the adjustments applied by the actuators 42-1 and 42-2 to separately reduce (e.g., minimize) the PARs of the modulated signals output by the IFFT functions 44-1 and 44-2. In some embodiments, the adaptor 48 adaptively configures the adjustments applied by the actuators 42-1 and 42-2 to reduce (e.g., minimize) the PAR of an aggregate of the modulated signals output by the IFFT functions 44-1 and 44-2 (i.e., reduce the PAR of the multi-carrier modulated signal resulting from the aggregation (e.g., summing or combining) of the two modulated signals). In some other embodiments, the adaptor 48 adaptively configures the adjustments applied by the actuators 42-1 and 42-2 to jointly optimize the adjustments made by the actuators 42-1 and 42-2 to provide PAR reduction and, optionally, MIMO precoding and/or beamforming, as described above for the single carrier scenario.

Figure 12:
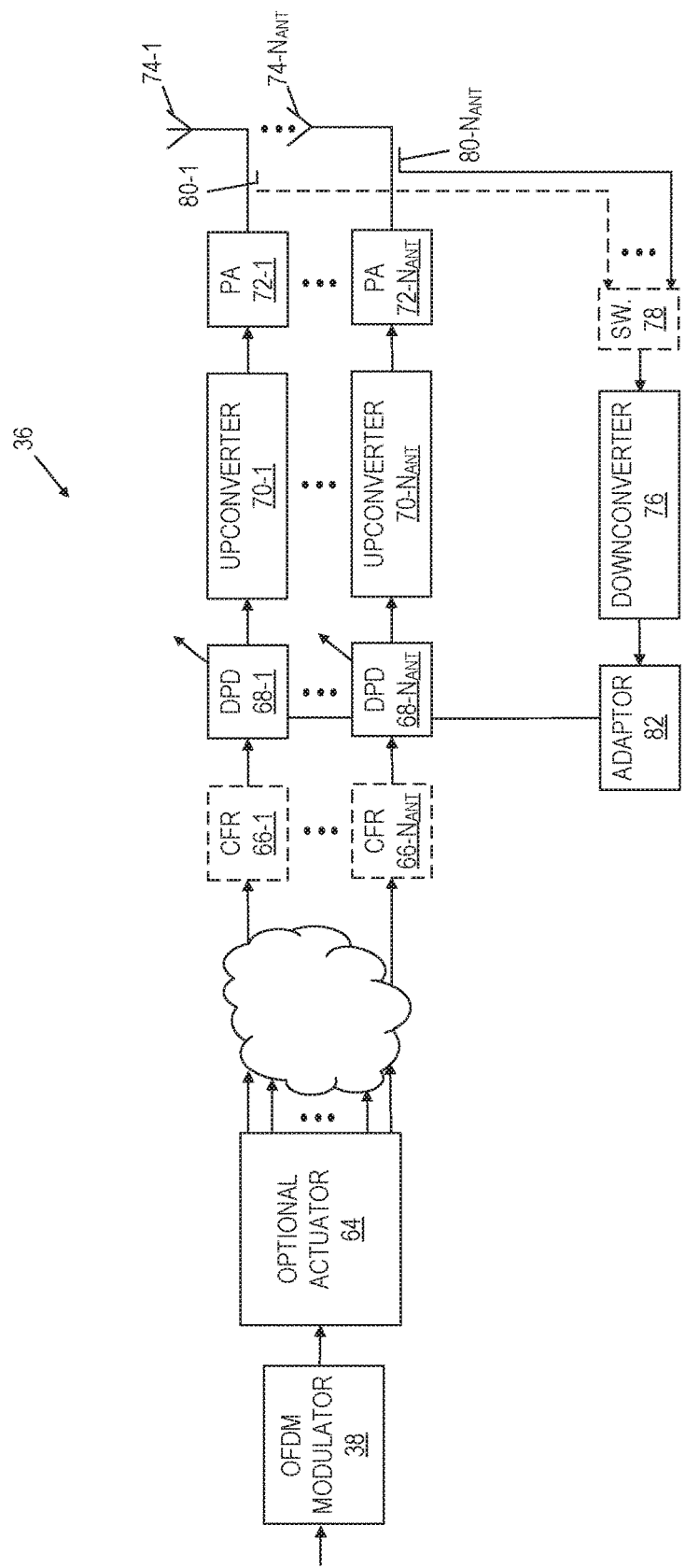
FIG. 12 illustrates a transmitter according to some other embodiments of the present disclosure in which the radio front-end includes Crest Factor Reduction (CFR) and/or Power Amplifier (PA) predistortion.

In the embodiments above, the CFR, PA predistortion, and TOR have been eliminated from the radio front-end of the transmitter 36. FIG. 12 illustrates the transmitter 36 according to some other embodiments of the present disclosure in which the radio front-end includes CFR and/or PA predistortion (including TOR feedback for adaptive configuration of the PA predistortion). Even when using the OFDM modulator 38 of the present disclosure, completely eliminating CFR and/or PA predistortion may be undesirable in some implementations. For example, there may be implementations in which it is desirable to push the PAs deeper into compressions even though the PAR is low.

In this regard, FIG. 12 illustrates one example of the transmitter 36 in which the radio front-end includes digital predistortion and, optionally, CFR. As illustrated, the radio front-end includes multiple ($N_{ANT}$) transmit branches including CFR functions 66-1 through 66-N$_{ANT}$ (optional), DPDs 68-1 through 68-N$_{ANT}$, upconverters 70-1 through 70-N$_{ANT}$, PAs 72-1 through 72-N$_{ANT}$, and antennas 74-1 through 74-N$_{ANT}$. The DPDs 68-1 through 68-N$_{ANT}$ and, optionally, the CFR functions 66-1 through 66-N$_{ANT}$ may be provided using conventional techniques, but are not limited thereto. For example, in this particular example, the radio front-end includes a single TOR, which includes a down-converter 76 having an input that is either: (a) coupled to the outputs of the PAs 72-1 through 72-N$_{ANT}$ via switching circuitry 78 and respective couplers 80-1 through 80-N$_{ANT}$ or (b) coupled to the output of a single one of the PAs 72-1 through 72-N$_{ANT}$ (output of the PA 72-N$_{ANT}$ in this example).

An adaptor 82 adaptively configures the DPDs 68-1 through 68-N$_{ANT}$. For example, in some embodiments, the adaptor 82 adaptively configures all of the DPDs 68-1 through 68-N$_{ANT}$ based on the feedback from a single one of the PAs (PA 72-N$_{ANT}$ in this example), e.g., using a common set of DPD coefficients. In some other embodiments, using the switching circuitry 78, the adaptor 82 is adaptively configures the DPDs 68-1 through 68-N$_{ANT}$ based on the feedback from the outputs of the respective PAs 72-1 through 72-N$_{ANT}$.

Thus far, the discussion has focused on embodiments of the transmitter 36 and the OFDM modulator 38. The discussion now will turn to a discussion of a receiver that operates to receive the signal transmitted by the transmitter 36. In some embodiments, the transmitter 36 transmits information (referred to herein as side information) that includes an indication of the adjustments applied by the actuator 42 of the OFDM modulator 38. This information may then be used by the receiver to properly demodulate the received signal. Note that in some embodiments the adjustments applied by the actuator 42 of the OFDM modulator 38 are for both PAR reduction and MIMO precoding and/or beamforming, and the side information may include an indication of only the portion of the adjustments applied for PAR reduction or an indication of the portion of the adjustments applied for PAR reduction and MIMO precoding and/or beamforming.

Figure 13:
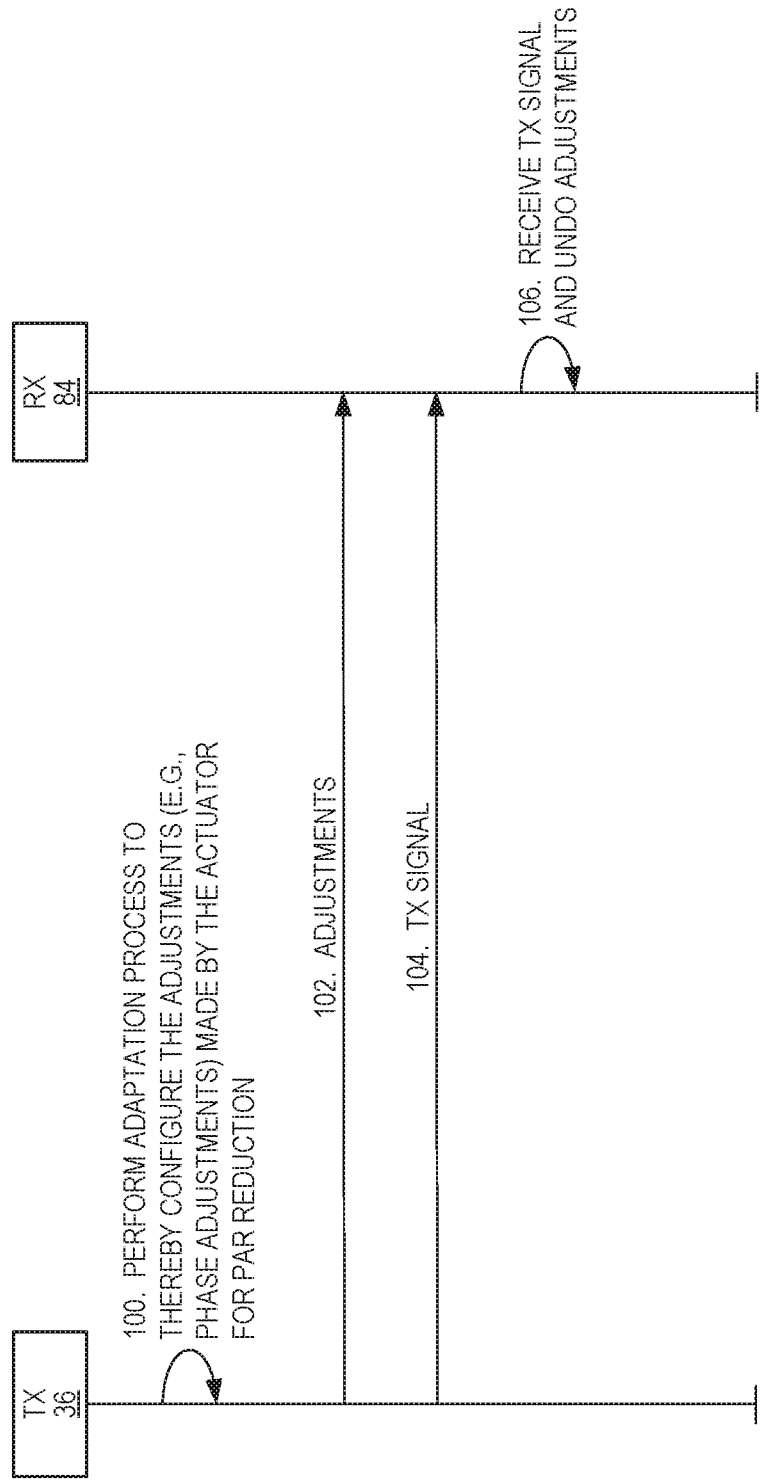
FIG. 13 illustrates the operation of a transmitter and a receiver according to some embodiments of the present disclosure in which the transmitter transmits side information that indicates adjustments made by an actuator of a modulator at the transmitter to reduced PAR according to some embodiments of the present disclosure.

In this regard, FIG. 13 illustrates the operation of the transmitter 36 and a receiver 84 according to some embodiments of the present disclosure. As illustrated, the transmitter 36 performs an adaptation process to thereby configure the adjustments (e.g., phase adjustments) applied by the OFDM modulator 38 (step 100), as described above. The transmitter 36 transmits side information including an indication of the adjustments applied by the OFDM modulator 38 (step 102). The transmitter 36 also transmits a modulated signal (step 104). At the receiver 84, the receiver 84 receives the side information and receives the transmitted signal using the side information to undo the adjustments made in the OFDM modulator 38 (step 106).

Figure 14:
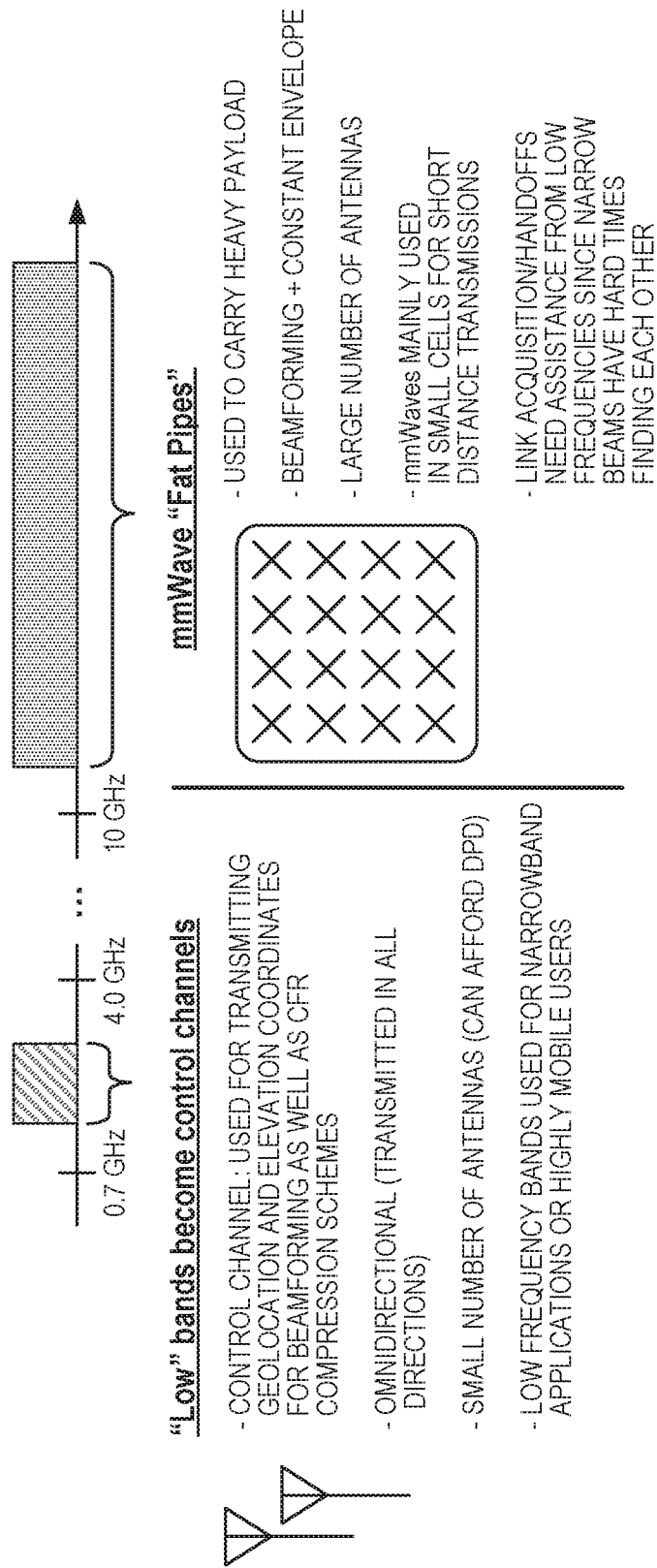
FIG. 14 illustrates one example of a spectrum allocation that can be utilized by the transmitter for transmission of side information and a desired signal according to some embodiments of the present disclosure.

While the transmitter 36 may transmit the side information using any suitable technique, in some embodiments, the transmitter 36 transmits the side information using resources in one frequency band and transmits the signal in another frequency band. FIG. 14 illustrates one example of such a spectrum allocation that is particularly well-suited for 5G and future cellular communications networks. As illustrated, low frequency bands can be used by the transmitter 36 to transmit control information such as Global Positioning System (GPS)/elevation coordinates for the millimeter-Wave (mmWave) beamforming as well as the side information, whereas high frequency bands (e.g., 5G mmWaves) can be used for data transmission. However, FIG. 14 is only one example.

Figure 15:
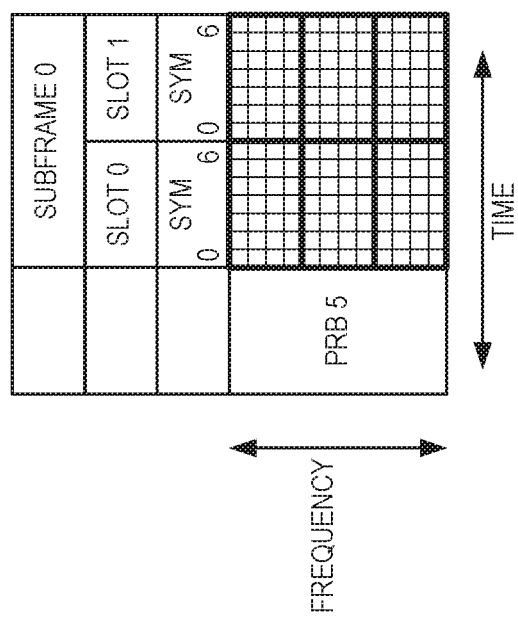
FIG. 15 illustrates grouping of subcarriers and symbol periods such that a single (i.e., the same) adjustment is made for all subcarriers and symbol periods within the same group according to some embodiments of the present disclosure.

In some embodiments, adaptation of the adjustments applied by the actuator 42 within the OFDM modulator 38 is performed in such a manner that multiple contiguous subcarriers are assigned the same adjustment. This concept may be extended to use the same adjustment for multiple contiguous subcarriers in the frequency domain and multiple consecutive symbols periods in the time domain, as illustrated in FIG. 15. In the example of FIG. 15, there are six subcarrier-symbol time groups. Each group includes four contiguous subcarriers and seven consecutive symbol periods. A single adjustment (e.g., a single phase adjustment) is configured for each of these groups. Thus, rather than having 12×14=168 adjustments, there are only six adjustments. This significantly reduces the amount of side information that is transmitted from the transmitter 36 to the receiver 84. Note that the grouping in FIG. 15 is only an example. The subcarriers and symbol times may be grouped in any desired manner. For example, there may be only subcarrier grouping where each group includes multiple contiguous subcarriers for a single symbol period. As another example, there may be only time period grouping where each group includes multiple consecutive symbol periods for a single subcarrier.

While side information may be used in some embodiments, in some other embodiments, the transmitter 36 does not transmit side information to the receiver 84. Rather, by using groupings as described above with respect to the example of FIG. 15, each group may include one or more pilot symbols used by the receiver 84 for channel estimation/equalization. In this case, the adjustments made by the OFDM modulator 38 can be seen by the receiver 84 as part of the wireless channel, and the receiver 84 automatically removes, or undoes, the adjustments made by OFDM modulator 38 during channel equalization without the need for side information.

Figure 16A:
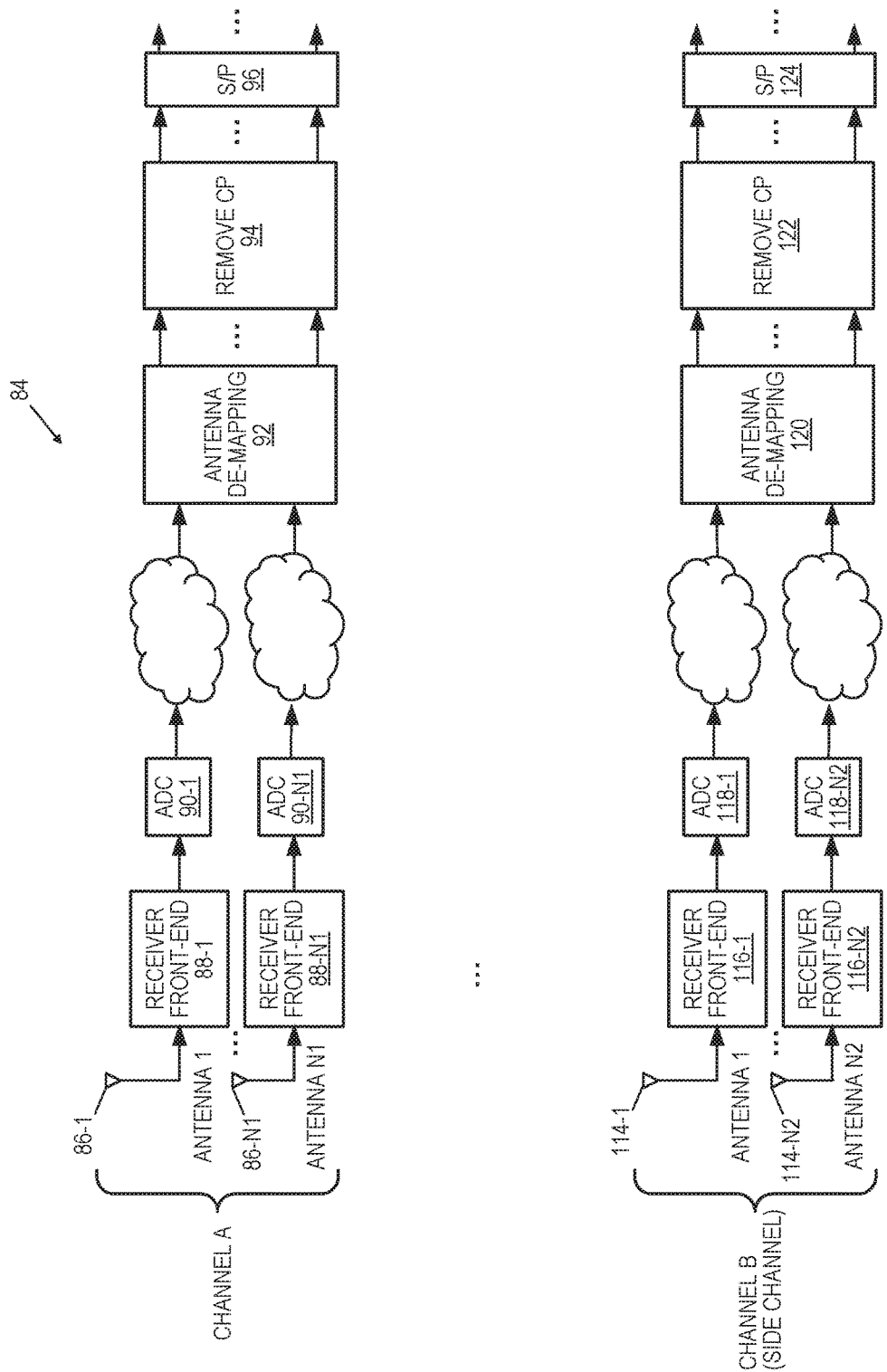
FIGS. 16A and 16B illustrate one example of a receiver that utilizes side information transmitted by the transmitter to remove, or undo, adjustments made by the actuator within the modulator at the transmitter for PAR reduction according to some embodiments of the present disclosure.
Figure 16B:
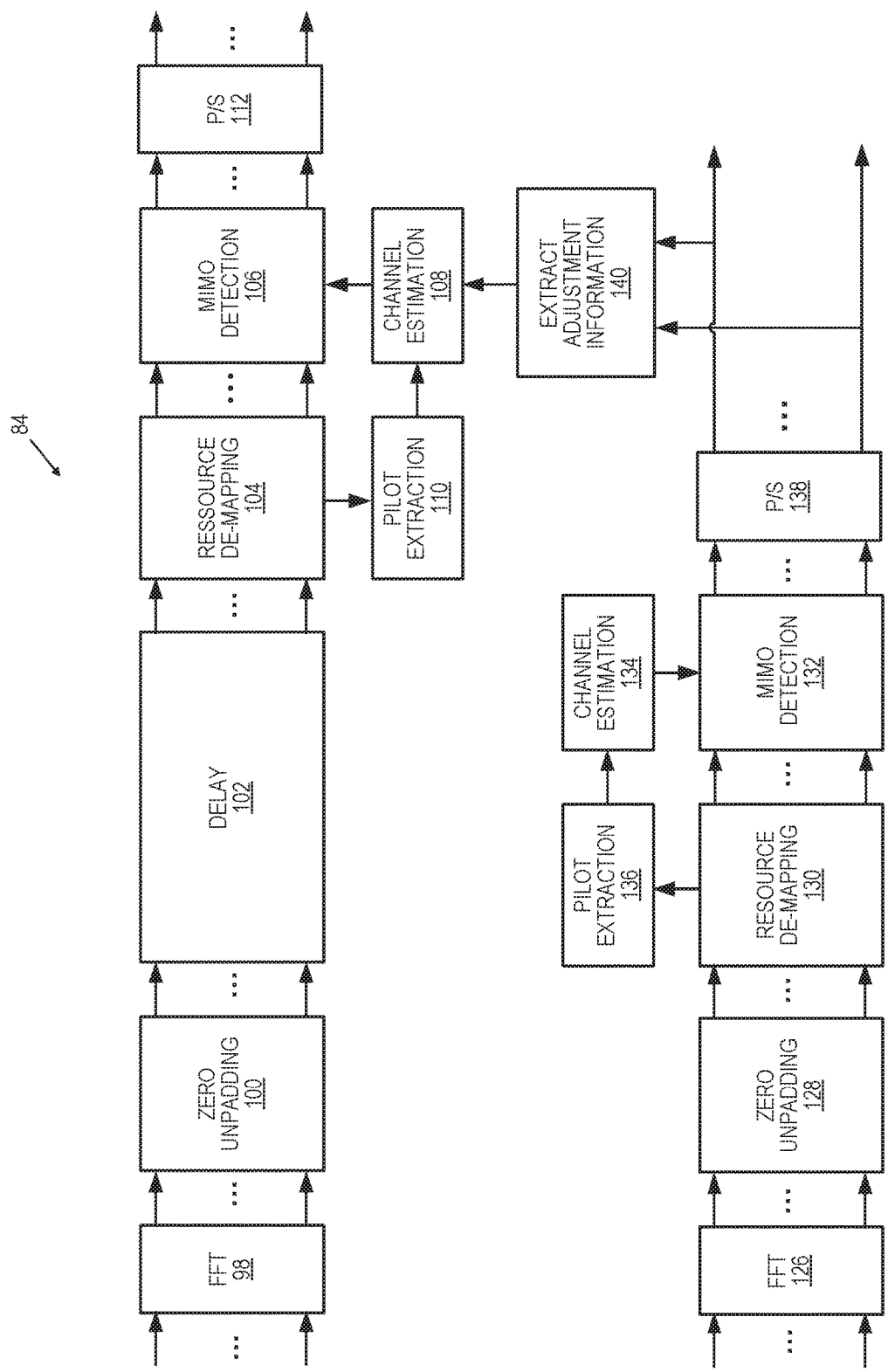

FIGS. 16A and 16B illustrate one example of the receiver 84 in which the receiver 84 receives the aforementioned side information from the transmitter 36 according to some embodiments of the present disclosure. In this example, the transmitted signal is received on Channel A, and the side information is received on Channel B. For Channel A, the receiver 84 includes antennas 86-1 through 86-N1, receiver front-ends 88-1 through 88-N1, and Analog-to-Digital Converters (ADCs) 90-1 through 90-N1 that provide respective receive signals. The receive signals are processed by an antenna de-mapping function 92, a CP removal function 94, and a S/P converter 96 to provide parallel receive signals that are then processed by a Fast Fourier Transform (FFT) function 98 to provide frequency domain receive signals that correspond to the input signals provided to the IFFT function 44 at the transmitter 36. A zero unpadding function 100 removes zero padding. The resulting signals are passed through an optional delay function 102 that delays the signals until the respective side information can be received on Channel B. The delayed signals are then processed by a resource de-mapping function 104 and a MIMO detection function 106. The MIMO detection function 106 operates to perform MIMO detection based on a channel estimate from a channel estimation function 108, as will be appreciated by one of ordinary skill in the art. The channel estimation function 106 estimates the wireless channel from the transmitter 36 to the receiver 84 for Channel A based on pilot symbols extracted from the received signals via a pilot extraction function 110 and then adjusts the channel estimate based on the side information received from the transmitter 36 to account for the adjustments made in the OFDM modulator 38 at the transmitter 36. By using the channel estimate that has been adjusted to account for the adjustments made in the OFDM modulator 38 at the transmitter 36, the MIMO detection function 106 undoes the adjustments. The output signals from the MIMO detection function 106 are passed through a Parallel-to-Serial (P/S) converter 112 to provide the final received signal.

In order to receive the side information on Channel B, the receiver 84 also includes antennas 114-1 through 114-N2, receiver front-ends 116-1 through 116-N2, and ADCs 118-1 through 118-N2 that provide respective receive signals. The receive signals are processed by an antenna de-mapping function 120, a CP removal function 122, and a S/P converter 124 to provide parallel receive signals that are then processed by a FFT function 126 to provide frequency domain receive signals. A zero unpadding function 128 removes zero padding. The resulting signals are then processed by a resource de-mapping function 130 and a MIMO detection function 132. The MIMO detection function 132 operates to perform MIMO detection based on a channel estimate from a channel estimation function 134, as will be appreciated by one of ordinary skill in the art. The channel estimation function 134 estimates the wireless channel from the transmitter 36 to the receiver 84 for Channel B based on pilot symbols extracted from the received signals via a pilot extraction function 136. The output signals from the MIMO detection function 132 are passed through a P/S converter 138 to provide the final received signal. An extract adjustment information function 140 extracts the side information, or more specifically the information that indicates the adjustments applied by the adaptor 42 of the OFDM modulator 38 at the transmitter 36, from the final received signal and provides the respective adjustments to the channel estimation function 108 for Channel A.

Figure 17A:
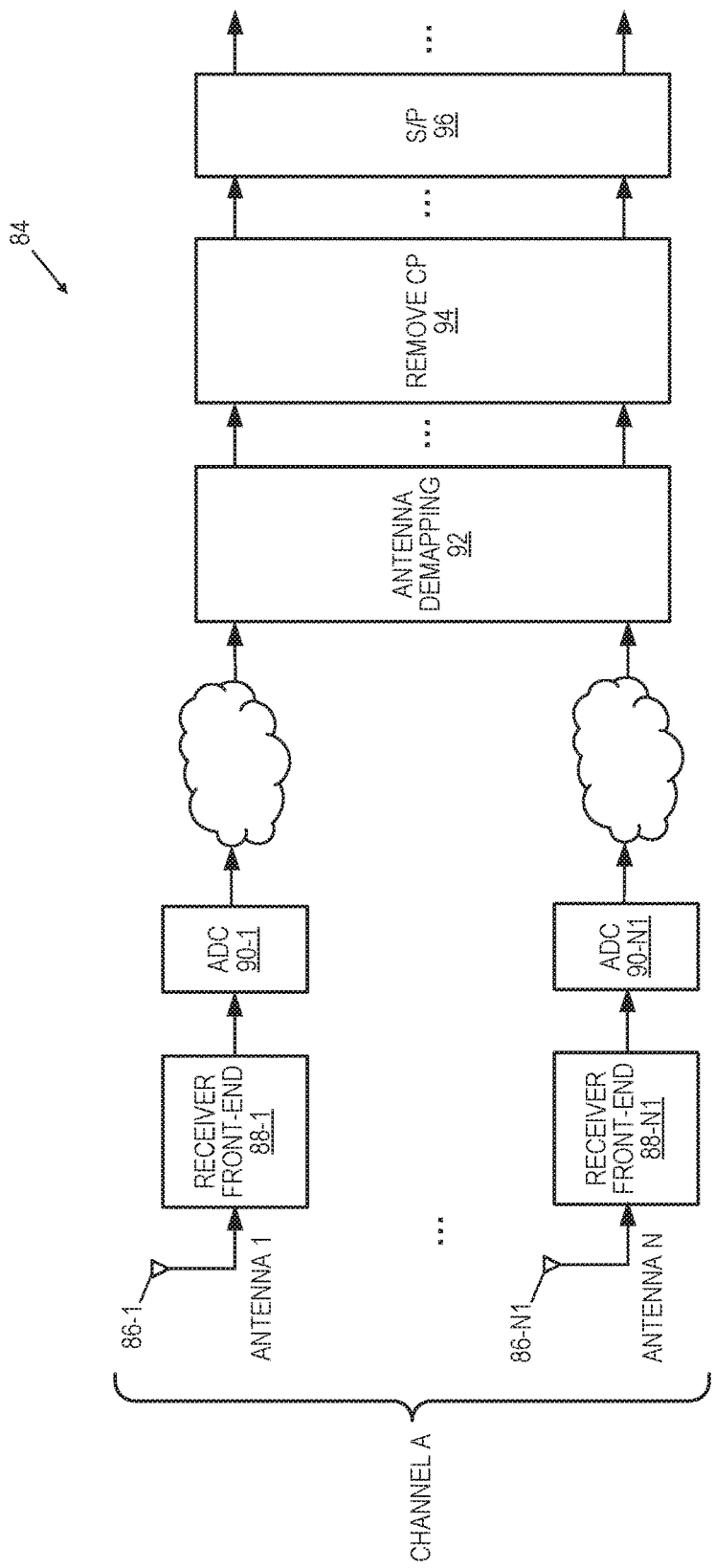
FIGS. 17A and 17B illustrate one example embodiment of a receiver that relies on channel estimation and equalization to remove adjustments made by the actuator within the modulator at the transmitter for PAR reduction according to some embodiments of the present disclosure.
Figure 17B:
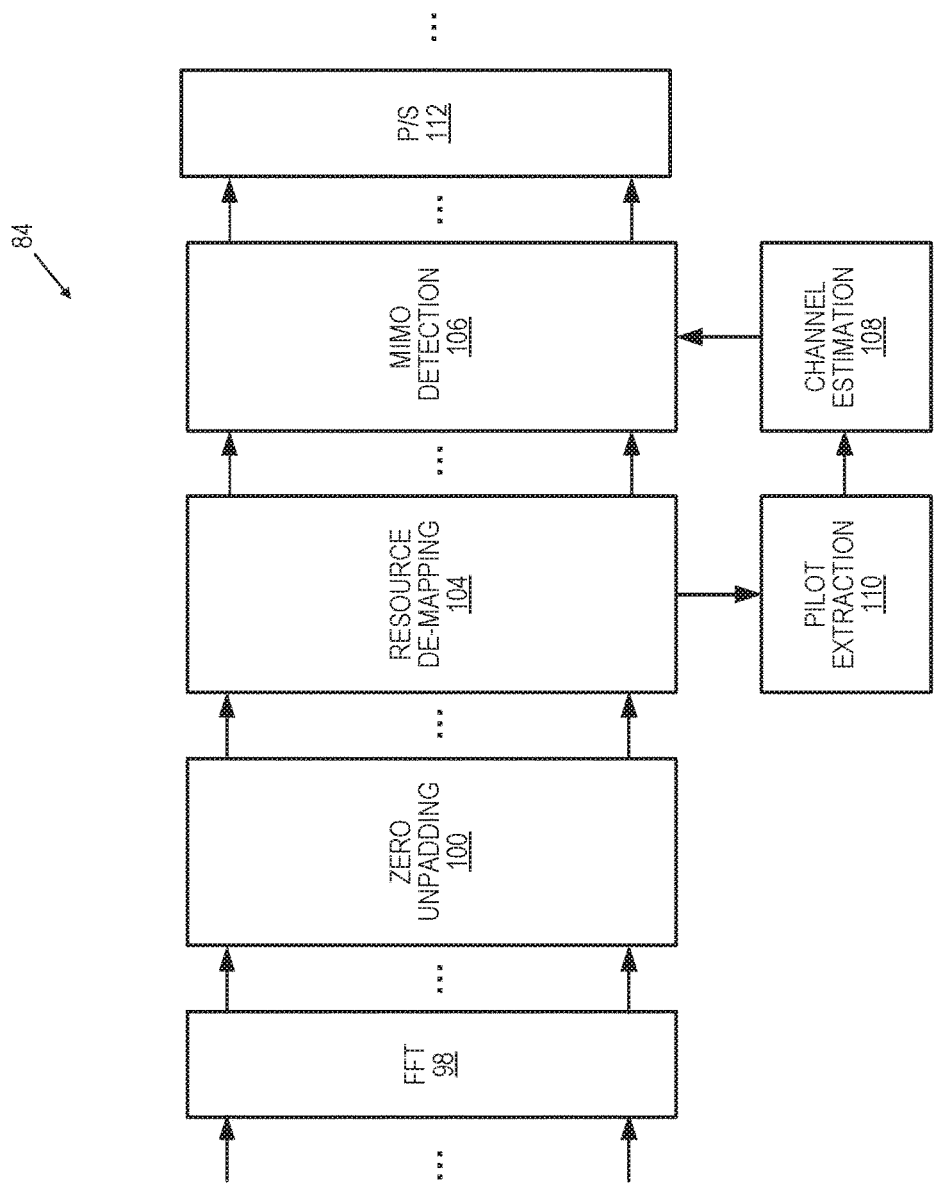

FIGS. 17A and 17B illustrate one example of the receiver 84 in which the receiver 84 does not receive the aforementioned side information from the transmitter 36 but automatically removes the adjustments made by the OFDM modulator 38 of the transmitter 36 as part of channel equalization according to some embodiments of the present disclosure. In this example, the receiver 84 is similar to the receive branch for Channel A in the embodiment of FIGS. 16A and 16B and, as such, the same reference numbers are used where appropriate. However, in this embodiment, the channel estimation function 108 estimates the wireless channel from the transmitter 36 to the receiver 84 for Channel A based on pilot symbols extracted from the received signals via the pilot extraction function 110. However, no adjustment is made to counteract the adjustments made at the transmitter 36 since no side information is received. Rather, the adjustments made by the actuator 42 of the OFDM modulator 38 at the transmitter 36 are treated as part of the wireless channel and therefore accounted for in the channel estimate.

Notably, the embodiment of FIGS. 16A and 16B (and more generally the use of side information) is beneficial in embodiments where the channel estimate does not or cannot account for the adjustments made in the OFDM modulator 38 at the transmitter 36. This is the case when, for example, there are separate adjustments for each subcarrier or where the groupings using for the adjustments (where a single adjustment is made for the entire group of subcarriers and/or symbol period, as described above) are small enough that each grouping does not include one or more pilot symbols. Conversely, the embodiment of FIGS. 17A and 17B (or more generally not transmitting side information) is beneficial where the adjustments made by the OFDM modulator 38 at the transmitter 36 can be viewed, by the receiver 84, as part of the wireless channel as a result of grouping of subcarriers and symbol periods for adjustments such that the same adjustment is applied over a group of subcarriers and symbol periods that include one or more pilot symbols used by the receiver 84 for channel estimation.

It should also be noted that the example embodiments of the receiver 84 illustrated in FIGS. 16A and 16B and FIGS. 17A and 17B are only examples. The architecture of the receiver 84 will of course vary depending on the particular implementation. In general, these embodiments illustrate the use of side information to undo the adjustments made by the OFDM modulator 38 of the transmitter 36 in some embodiments and to rely on channel estimation and equalization to undo the adjustments made by the OFDM modulator 38 of the transmitter 36 in some other embodiments.

It should also be noted that while the discussion above focuses on multi-subcarrier modulation and, in particular, OFDM modulation, the present disclosure is not limited thereto. For example, the concepts disclosed herein may also be applicable to single carrier modulation (e.g., Gaussian Minimum Shift Keying (GMSK) or 8 Pre-Shared Key (PSK) modulation used for Global System for Mobile Communications (GSM)) where adjustments are made to multiple inputs for multiple carriers, respectively, prior to performing one or more modulation operations such that, after aggregation of the resulting multiple modulated signals, the PAR of the aggregate signal is reduced (e.g., minimized).

Figure 18:
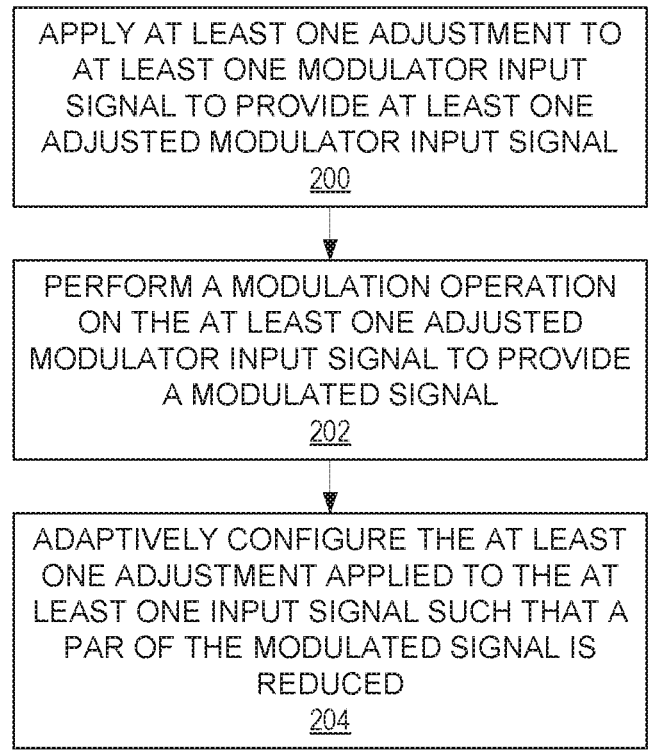
FIG. 18 is a flow chart that illustrates the operation of a transmitter according to some embodiments of the present disclosure.

FIG. 18 is a flow chart that illustrates the operation of the transmitter 36 according to some embodiments of the present disclosure. As illustrated, the transmitter 36, and in particular the actuator 42 of the OFDM modulator 38, applies at least one adjustment to at least one modulator input signal to provide at least one adjusted modulator input signal, as described above (step 200). The transmitter 36, and in particular the OFDM modulator 38, performs a modulation operation (e.g., inverse Fourier Transform) on the at least one adjusted modulator input signal to provide a modulated signal, as described above (step 202). The transmitter 36, and in particular the adaptor 48 of the OFDM modulator 38, adaptively configures the at least one adjustment applied to the at least one input signal such that a PAR of the modulated signal is reduced, as described above (step 204).

Figure 19:
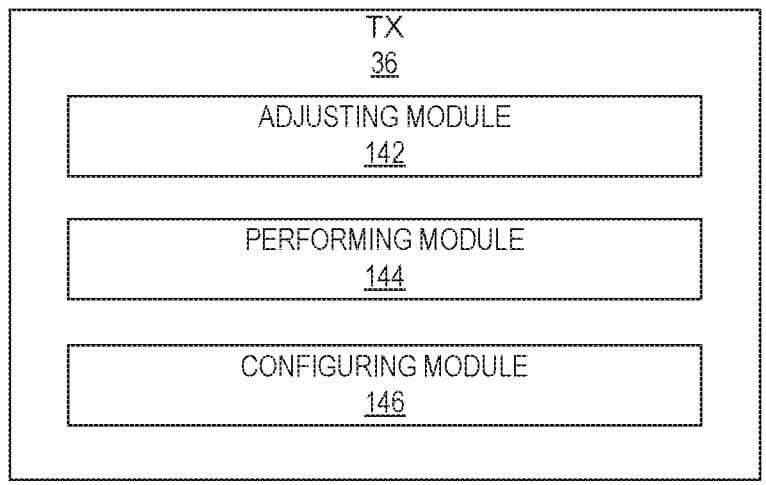
FIG. 19 is a block diagram of a transmitter according to some embodiments of the present disclosure.

FIG. 19 is a block diagram of the transmitter 36 according to some embodiments of the present disclosure. In this example, the transmitter 36 includes an adjusting module 142, a performing module 144, and a configuring module 146, each of which is implemented in software. The adjusting module 142 is operable to apply at least one adjustment to at least one modulator input signal to provide at least one adjusted modulator input signal. The performing module 144 is operable to perform a modulation operation on the at least one adjusted modulator input signal to provide a modulated signal. The configuring module 146 is operable to adaptively configure the at least one adjustment applied to the at least one input signal such that a PAR of the modulated signal is reduced.

While not being limited to or by any particular advantage, embodiments of the present disclosure provide some or all of the following advantages, depending on the particular embodiment:

Embodiments of the present disclosure eliminate the need for traditional non-linear CFR and PA predistortion in the radio front-end by generating low PAR (e.g., OFDM) signals.

Some embodiments of the present disclosure introduce the concept of integrated modulation, peak reduction, and MIMO/beamforming coding into a single processing step.

The ultra-low PARs offered by embodiments of the present disclosure significantly increase the PAs' efficiency and even allow for the use of simpler PA architectures.

Embodiments that do not rely on the transmission of side information to the receiver introduce a very efficient way of "embedding" the modulation coding scheme into the wireless channel response so that it is automatically removed by the channel equalizer in the receiver—at no extra cost. Thus, this eliminates the need for communicating this information in a side channel.

The following acronyms are used throughout this disclosure.

5G Fifth Generation
ADC Analog-to-Digital Converter
CCDF Complementary Cumulative Distribution Function
CFR Crest Factor Reduction
CP Cyclic Prefix
CPRI Common Public Radio Interface
dB Decibel
DPD Digital Predistortion
EVM Error Vector Magnitude
FFT Fast Fourier Transform
GMSK Gaussian Minimum Shift Keying
GPS Global Positioning System
GSM Global System for Mobile Communications
IFFT Inverse Fast Fourier Transform
LAA License Assisted Access
LTE Long Term Evolution
LTE-U Long Term Evolution in Unlicensed Spectrum
MHz Megahertz
MIMO Multiple-Input-Multiple-Output
mmWave Millimeter-Wave
MU-MIMO Multi-User Multiple-Input-Multiple-Output
OFDM Orthogonal Frequency Division Multiplexing
PA Power Amplifier
PAR Peak-to-Average Ratio
P/S Parallel-to-Serial
PSK Pre-Shared Key
QAM Quadrature Amplitude Modulation
QPSK Quadrature Phase Shift Keying
RF Radio Frequency
RMS Root Mean Square
S/P Serial-to-Parallel
TOR Transmitter Observation Receiver
UE User Equipment Those skilled in the art will recognize improvements and modifications to the embodiments of the present disclosure. All such improvements and modifications are considered within the scope of the concepts disclosed herein and the claims that follow.

What is claimed is:

1. A transmitter, comprising:
a modulator comprising:
an actuator operable to apply at least one adjustment to at least one modulator input signal to provide at least one adjusted modulator input signal;
modulation circuitry operable to perform a modulation operation on the at least one adjusted modulator input signal to provide a modulated signal; and
an adaptor operable to, based on the modulated signal, adaptively calculate the at least one adjustment applied to the at least one modulator input signal such that an error between an instantaneous magnitude of the modulated signal and a Root Mean Square, RMS, value of the modulated signal is minimized, thereby reducing a Peak-to-Average Ratio, PAR, of the modulated signal.

2. The transmitter of claim 1 wherein:
the at least one modulator input signal comprises a plurality of parallel modulator input signals for a respective plurality of subcarriers, the at least one adjustment comprises a plurality of adjustments, and the at least one adjusted modulator input signal comprises a plurality of adjusted modulator input signals;
the actuator is operable to apply the plurality of adjustments to the plurality of parallel modulator input signals to provide the plurality of adjusted modulator input signals; and
the modulation circuitry is operable to perform the modulation operation on the plurality of adjusted modulator input signals to provide the modulated signal.

3. The transmitter of claim 2 wherein the modulator is an Orthogonal Frequency Division Multiplexing, OFDM, modulator, and the modulation circuitry comprises transform circuitry adapted to perform an inverse Fourier transform on the plurality of adjusted modulator input signals to provide the modulated signal.

4. The transmitter of claim 2 wherein the plurality of adjustments comprise a plurality of adjustments for the plurality of subcarriers, respectively, for each of one or more symbol periods.

5. The transmitter of claim 2 wherein the plurality of adjustments comprise a plurality of adjustments for each the plurality of subcarriers within a single symbol period.

6. The transmitter of claim 2 wherein the plurality of adjustments comprise two or more adjustments for two or more groups of the plurality of subcarriers, respectively, for each of one or more symbol periods.

7. The transmitter of claim 2 wherein the plurality of adjustments comprise two or more adjustments for each of two or more groups of the plurality of subcarriers within a single symbol period.

8. The transmitter of claim 2 wherein the plurality of adjustments comprise a plurality of adjustments for a plurality of blocks of subcarriers and symbol periods, where each block of the plurality of blocks comprises two or more of the plurality of subcarriers and two or more symbol periods.

9. The transmitter of claim 1 wherein the at least one adjustment is at least one phase adjustment.

10. The transmitter of claim 1 wherein the transmitter relies on channel equalization at a receiver to remove the at least one adjustment.

11. The transmitter of claim 1 wherein the transmitter is further adapted to transmit an indication of the at least one adjustment to a receiver.

12. The transmitter of claim 11 wherein the transmitter is further adapted to transmit the indication of the at least one adjustment to the receiver via a channel separate from a channel over which the transmitter transmits the modulated signal to the receiver.

13. The transmitter of claim 1 wherein:
the at least one modulator input signal comprises a plurality of parallel modulator input signals;
the at least one adjustment comprises a plurality of adjustments applied to the plurality of parallel modulator input signals, respectively; and
the adaptor is operable to adaptively calculate the plurality of adjustments applied to the plurality of parallel modulator input signals to provide both: (a) reduction of the PAR of the modulated signal and (b) Multiple-Input-Multiple-Output, MIMO, precoding and/or beamforming.

14. The transmitter of claim 13 wherein:
the at least one modulator input signal comprises the plurality of parallel modulator input signals;
the at least one adjustment comprises the plurality of adjustments applied to the plurality of parallel modulator input signals, respectively;
the transmitter (36) further comprises a second actuator operable to apply a plurality of weights to the modulated signal to thereby provide a plurality of modulated signals to be transmitted via a plurality of antennas of the transmitter; and
the adaptor is operable to adaptively calculate, in a joint manner:
the plurality of adjustments applied to the plurality of parallel modulator input signals and the plurality of weights in a joint manner to provide both: (a) reduction of the PAR of the modulated signal and (b) MIMO precoding and/or beamforming; and
the plurality of weights applied to the modulated signal by the second actuator to provide beamforming and/or antenna calibration.

15. The transmitter of claim 1 wherein the transmitter further comprises a digital predistortion subsystem operable to digitally predistort the plurality of modulated signals to compensate for a non-linear characteristic of respective power amplification circuits.

16. The transmitter of claim 1 wherein the modulator further comprises:
a second actuator operable to apply at least one second adjustment to at least one second modulator input signal to provide at least one second adjusted modulator input signal; and
second modulation circuitry operable to perform a modulation operation on the at least one second adjusted modulator input signal to provide a second modulated signal;
wherein the adaptor is operable to adaptively calculate the at least one adjustment applied to the at least one modulator input signal such that the error between the instantaneous magnitude of the modulated signal and the RMS value of the modulated signal is minimized thereby reducing the PAR of the modulated signal and adaptively calculate the at least one second adjustment applied to the at least one second modulator input signal such that an error between an instantaneous magnitude of the second modulated signal and a RMS value of the second modulated signal is minimized thereby reducing a PAR of the second modulated signal.

17. The transmitter of claim 1 wherein the modulator further comprises:
a second actuator operable to apply at least one second adjustment to at least one second modulator input signal to provide at least one second adjusted modulator input signal; and second modulation circuitry operable to perform a modulation operation on the at least one second adjusted modulator input signal to provide a second modulated signal;
wherein the adaptor is operable to adaptively calculate the at least one adjustment applied to the at least one modulator input signal and the at least one second adjustment applied to the at least one second modulator input signal such that a PAR of a multi-carrier signal is reduced, the multi-carrier signal being an aggregation of a plurality of modulated signals comprising the first modulated signal and the second modulated signal.

18. The transmitter of claim 1 wherein the transmitter is a wireless transmitter.

19. The transmitter of claim 1 wherein the transmitter is a wireless transmitter of a radio node for a cellular communications network.

20. A method of operation of a transmitter, comprising:
applying at least one adjustment to at least one modulator input signal to provide at least one adjusted modulator input signal;
performing a modulation operation on the at least one adjusted modulator input signal to provide a modulated signal; and
adaptively calculating, based on the modulated signal, the at least one adjustment applied to the at least one input signal such that an error between an instantaneous magnitude of the modulated signal and a Root Mean Square, RMS, value of the modulated signal is minimized, thereby reducing a Peak-to-Average Ratio, PAR, of the modulated signal.

21. A receiver, comprising:
at least one receiver subsystem operable to:
receive, from a transmitter, a first signal and a second signal, the second signal comprising an indication of at least one adjustment applied to at least one modulator input signal at the transmitter to provide at least one adjusted modulator input signal having a reduced Peak to Average Ratio, PAR, when generating the first signal for transmission at the transmitter; and
apply at least one adjustment during reception of the first signal that compensates for the at least one adjustment applied to the at least one modulator input signal at the transmitter.

22. A transmitter adapted to transmit an indication of at least one adjustment to a receiver, the at least one adjustment being at least one adjustment applied to reduce, during modulation, a Peak-to-Average Ratio, PAR, of a modulated signal transmitted from the transmitter to the receiver.

23. The transmitter of claim 22 wherein the transmitter is further adapted to transmit the indication of the at least one adjustment to the receiver via a channel separate from a channel over which the transmitter transmits the modulated signal to the receiver.

* * * * *